United States Patent
Yabe et al.

(10) Patent No.: US 9,228,319 B2
(45) Date of Patent: Jan. 5, 2016

(54) COOLING DEVICE AND CONSTRUCTION MACHINE OR WORKING MACHINE EQUIPPED WITH THE SAME

(75) Inventors: Mitsuo Yabe, Hiratsuka (JP); Hiroki Shinoda, Hiratsuka (JP); Masahiro Ikeda, Chigasaki (JP); Tomoya Watanabe, Hiratsuka (JP); Atsushi Kawano, Kanagawa (JP); Seiichi Fuchita, Katano (JP); Yasuhiro Kusuyama, Hirakata (JP); Teruyuki Matsuki, Hadano (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 505 days.

(21) Appl. No.: 12/675,140

(22) PCT Filed: Aug. 29, 2008

(86) PCT No.: PCT/JP2008/065544
§ 371 (c)(1),
(2), (4) Date: Mar. 31, 2010

(87) PCT Pub. No.: WO2009/028669
PCT Pub. Date: Mar. 5, 2009

(65) Prior Publication Data
US 2010/0200194 A1      Aug. 12, 2010

(30) Foreign Application Priority Data

Aug. 31, 2007  (JP) .................................. 2007-226246
May 7, 2008  (JP) .................................. 2008-121700

(51) Int. Cl.
*B60H 1/00*   (2006.01)
*E02F 9/00*   (2006.01)
(Continued)

(52) U.S. Cl.
CPC .................. *E02F 9/00* (2013.01); *E02F 9/0866* (2013.01); *F01P 11/10* (2013.01); *F04D 29/164* (2013.01)

(58) Field of Classification Search
CPC ........... B60H 1/00021; B60H 1/00457; B60H 1/00464; B60H 1/00521; B60H 1/242; B60H 1/241; B60H 2001/00078; B60H 2001/006; F01P 5/02; F01P 5/06

USPC .................. 165/41, 47, 121, 44, 51, 122, 123; 415/220, 222, 223

See application file for complete search history.

(56) References Cited

U.S. PATENT DOCUMENTS 3,827,825 A * 8/1974 Shipes ........................... 415/220
4,018,297 A * 4/1977 Haupt ........................... 180/68.1
(Continued)

FOREIGN PATENT DOCUMENTS

JP        57-75200        10/1955
JP        5-44469 A       2/1993
(Continued)

OTHER PUBLICATIONS

U.S. Appl. No. 12/675,123; First Named Inventor: Mitsuo Yabe; Title: "Cooling Device and Construction Machine . . . "; filed Feb. 25, 2010.
(Continued)

*Primary Examiner* — Travis Ruby
(74) *Attorney, Agent, or Firm* — Fish & Richardson P.C.

(57) ABSTRACT

A cooling device includes: a cooling fan; a shroud provided at an outer circumferential side of the cooling fan; an inner circumferential wall provided on the shroud and adjacent to the outer circumference of the cooling fan; and an outer circumferential wall provided to surround the inner circumferential wall. An air-flow-direction downstream side end of the outer circumferential wall is positioned at a further downstream position in an air flow direction than an air-flow-direction downstream side end of the inner circumferential wall. An air-flow-direction downstream side end of the cooling fan is positioned at a further downstream position than the air-flow-direction downstream side end of the inner circumferential wall. A ratio between a length of the outer circumferential wall and a length of the inner circumferential wall in the air flow direction is 1.07 or more and 1.81 or less, and a width between the outer circumferential wall and the inner circumferential wall is 15 mm or more and 55 mm or less.

15 Claims, 21 Drawing Sheets

(51) Int. Cl.
*E02F 9/08* (2006.01)
*F01P 11/10* (2006.01)
*F04D 29/16* (2006.01)

(56) References Cited

U.S. PATENT DOCUMENTS

| | | | |
|---|---|---|---|
| 5,272,886 A * | 12/1993 | Ukai et al. | 62/280 |
| 6,024,536 A | 2/2000 | Tsubakida et al. | |
| 6,599,088 B2 | 7/2003 | Stagg | |
| 2002/0009365 A1 | 1/2002 | Kataoka et al. | |
| 2004/0258530 A1 | 12/2004 | Oono et al. | |
| 2007/0160468 A1 | 7/2007 | Tsubota | |
| 2008/0193286 A1 | 8/2008 | Kakishita et al. | |
| 2010/0200193 A1 | 8/2010 | Yabe et al. | |
| 2010/0206525 A1 | 8/2010 | Yabe et al. | |
| 2010/0206526 A1 | 8/2010 | Yabe et al. | |

FOREIGN PATENT DOCUMENTS

| | | |
|---|---|---|
| JP | 8-61065 A | 3/1996 |
| JP | 9-14198 A | 1/1997 |
| JP | 09-112270 A | 4/1997 |
| JP | 9-118141 A | 5/1997 |
| JP | 9-264138 A | 10/1997 |
| JP | 10-205497 A | 8/1998 |
| JP | 10-281098 A | 10/1998 |
| JP | 11-2127 A | 1/1999 |
| JP | 2000-336694 A | 12/2000 |
| JP | 2002-038952 A | 2/2002 |
| JP | 2003-120589 A | 4/2003 |
| JP | 2004-270568 A | 9/2004 |
| JP | 3775848 B2 | 3/2006 |
| JP | 2006-132380 A | 5/2006 |
| JP | 2006-132381 A | 5/2006 |
| WO | WO 2005/098213 A1 | 10/2005 |

OTHER PUBLICATIONS

U.S. Appl. No. 12/675,127; First Named Inventor: Mitsuo Yabe; Title: "Cooling Device and Construction Machine . . ."; filed Feb. 25, 2010.

U.S. Appl. No. 12/675,145; First Named Inventor: Mitsuo Yabe; Title: "Cooling Device and Construction Machine . . ."; filed Feb. 25, 2010.

International Preliminary Report on Patentability dated Mar. 30, 2010 (in English) in counterpart International Application No. PCT/JP2008/065544.

International Search Report dated Sep. 25, 2008 issued in International Appln. No. PCT/JP2008/065544.

* cited by examiner

FIG.11
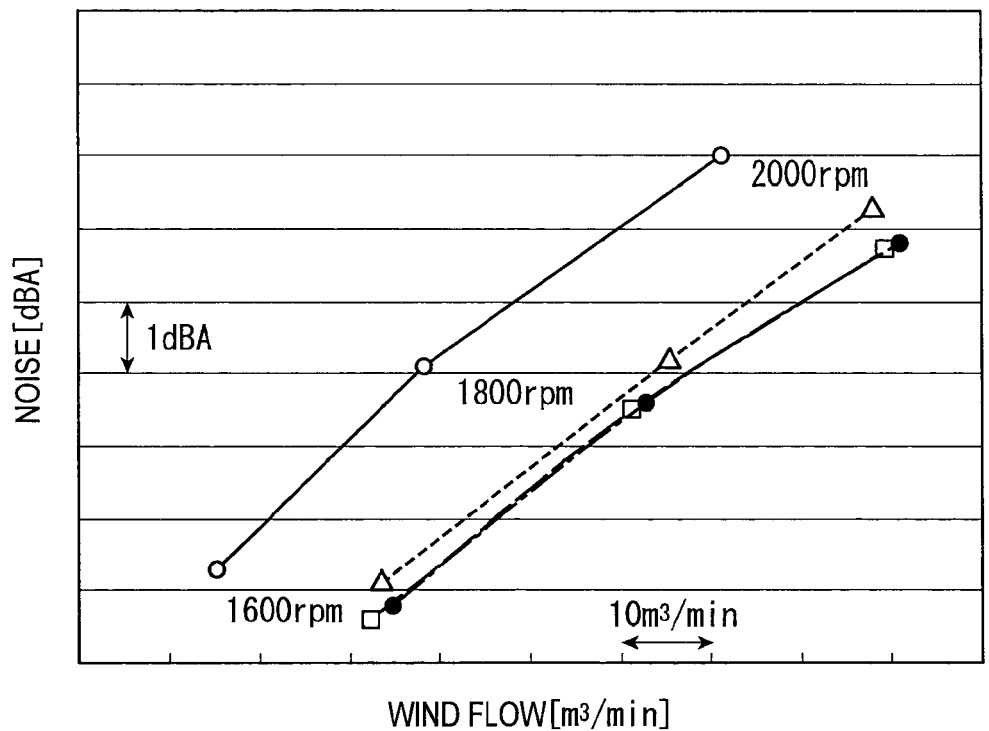
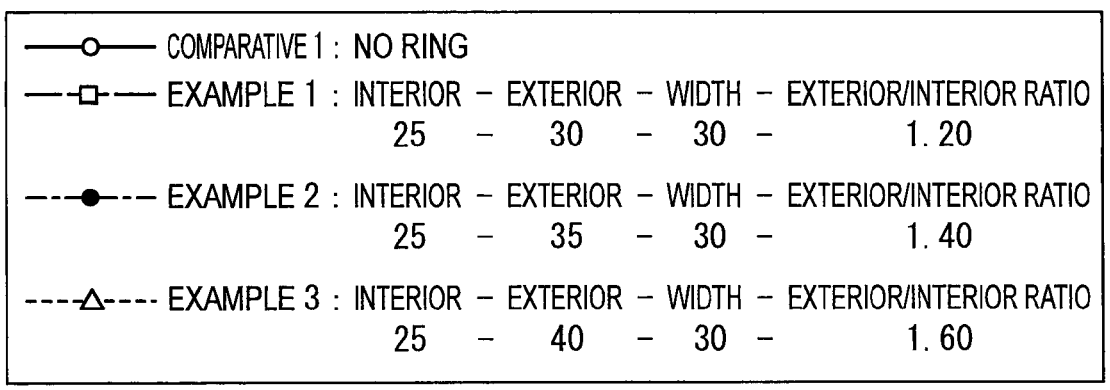

ND CONSTRUCTION
COOLING DEVICE AND CONSTRUCTION MACHINE OR WORKING MACHINE EQUIPPED WITH THE SAME

This application is a U.S. National Phase Application under 35 USC 371 of International Application PCT/JP2008/065544 filed Aug. 29, 2008.

TECHNICAL FIELD

The present invention relates to a cooling device and a construction machine or work machine including the same. More particularly, the present invention relates to a cooling device including a cooling fan and a shroud surrounding the cooling fan, and a construction machine or work machine including the same.

BACKGROUND ART

Traditionally, a cooling system of an engine installed in a construction machine mainly includes a radiator and a cooling fan. The radiator circulates cooling medium between the radiator and the engine and cools the cooling medium by outer air. The cooling fan forms air flow around the radiator and aids heat exchange of the radiator. Further, a shroud is provided between the radiator and the cooling fan to surround the radiator and the cooling fan for ensuring air flow from the radiator to the cooling fan (for example, see Patent Document 1).

In recent years, the total heat quantity of an engine is increased and therefore the water temperature of a radiator is increased. To solve such a problem, for example, the flow of air blown by a cooling fan (i.e., the flow of air passing through the vicinity of the radiator) may be increased by increasing the rotation speed of the cooling fan. However, when the rotation speed of the cooling fan is increased, noise is increased.

Accordingly, to enhance cooling capability of a cooling system of the engine, it is required to increase the flow of air blown by the cooling fan without increasing the rotation speed of the cooling fan. Various technologies for changing a shape and position of a shroud have been developed. For example, to prevent counter flow of air discharged from the cooling fan (i.e., to prevent air in the engine from returning to the radiator through the cooling fan), two cylindrical portions are provided on an end of the shroud (for example, see Patent Document 2).

Patent Document 1: JP-A-9-118141 (Published on May 6, 1997)

Patent Document 2: JP-A-2006-132380 (Published on May 25, 2006)

DISCLOSURE OF THE INVENTION

Problems to Be Solved by the Invention

However, according to the cooling system of the engine disclosed in Patent Document 1, the cooling fan is completely accommodated in the shroud. Accordingly, the flow of air discharged from the cooling fan is not sufficiently increased.

Also, according to the cooling system of the engine disclosed in Patent Document 2, the entire cooling fan is provided outside of the shroud. Accordingly, the flow of air discharged from the cooling fan is not rarely affected by the cylindrical portions of the shroud. Thus, the flow of air discharged from the cooling fan is not sufficiently increased.

An object of the invention is to provide a cooling device capable of sufficiently increasing flow of air from a cooling fan without increasing rotation speed of the cooling fan, and to provide a construction machine or work machine equipped with the cooling device.

Means for Solving the Problems

A cooling device according to an aspect of the invention includes: a cooling fan; a shroud provided at an outer circumferential side of the cooling fan; an inner circumferential wall provided on the shroud and adjacent to the outer circumference of the cooling fan; and an outer circumferential wall provided to surround the inner circumferential wall, an air-flow-direction downstream side end of the outer circumferential wall being positioned at a further downstream position in an air flow direction than an air-flow-direction downstream side end of the inner circumferential wall, in which an air-flow-direction downstream side end of an outer circumferential edge of the cooling fan is positioned at a further downstream position in the air flow direction than the air-flow-direction downstream side end of the inner circumferential wall, a ratio between an air-flow-direction length of the outer circumferential wall and an air-flow-direction length of the inner circumferential wall is 1.07 or more and 1.81 or less, and a width between the outer circumferential wall and the inner circumferential wall is 15 mm or more and 55 mm or less.

The inner circumferential wall and the outer circumferential wall may be provided by arranging a plurality of members around a rotation shaft of the cooling fan. However, it is preferable that at least either one of the inner circumferential wall and the outer circumferential wall is a ring that is consecutively provided around the rotation shaft of the cooling fan.

In the cooling device according to the aspect of the invention, the air-flow-direction length of the outer circumferential wall and the air-flow-direction length of the inner circumferential wall are set such that the ratio therebetween is in the above-described range, and the width between the outer circumferential wall and the inner circumferential wall is set in the above-described range. With this arrangement, when the cooling fan is rotated and an air flow is generated, negative pressure generated within a space provided between the inner circumferential wall and outer circumferential wall of the ring suctions the air, or the suctioned air is swept from the space. Accordingly, the flow of air blown by the cooling fan is increased. Thus, cooling capability is enhanced even when the rotation speed of the cooling fan is the same as conventional. Even when the rotation speed of the cooling fan is reduced, the same cooling capability can be obtained and the noise can be reduced.

Preferably in the cooling device according to the aspect of the invention, an interior covering ratio is in a range of 45 to 85%, the interior covering ratio being defined as a ratio between: an air-flow-direction length of a portion of the outer circumferential edge of the cooling fan covered by the shroud and the inner circumferential wall; and a maximum air-flow-direction length of the cooling fan.

Since the interior covering ratio is set in the range of 45 to 85% in the cooling device according to the aspect of the invention, the flow of air blown by the cooling fan is sufficiently increased. Thus, the cooling capability is enhanced even when the rotation speed of the cooling fan is the same as conventional. Even when the rotation speed of the cooling fan is reduced, the same cooling capability can be obtained.

Preferably in the cooling device according to the aspect of the invention, at least one of the inner circumferential wall and the outer circumferential wall may be integrated with the shroud.

To integrally form at least either one of the inner circumferential wall and the outer circumferential wall with the shroud, at least either one of the shroud and the inner circumferential wall and outer circumferential wall may be made of resin and formed integrally by injection molding.

In such a cooling device, the load of assembling work can be reduced by reduction of the number of parts because at least either one of the inner circumferential wall and the outer circumferential wall is integrated with the shroud.

Preferably in the cooling device according to the aspect of the invention, at least one of the inner circumferential wall and the outer circumferential wall is formed by a member different from the shroud.

In such a cooling device, the inner circumferential wall and the outer circumferential wall can be appropriately selected suitably for the arrangement of the shroud and the cooling fan because at least either one of the inner circumferential wall and the outer circumferential wall is attachable to the shroud.

The cooling device according to the aspect of the invention preferably further includes an annular base connecting the inner circumferential wall to the outer circumferential wall.

It is easy to manufacture and manage such a cooling device owing to the use of single integrated member formed by the inner circumferential wall, the outer circumferential wall and the base.

Preferably in the cooling device according to the aspect of the invention, at least one of the inner circumferential wall and the outer circumferential wall includes a cylindrical portion extending in parallel to the air flow direction.

According to such a cooling device, it is easy to manufacture the inner circumferential wall and the outer circumferential wall because at least one of the inner circumferential wall and the outer circumferential wall has a cylindrical portion extending in parallel to the air flow direction.

Preferably in the cooling device according to the aspect of the invention, at least one of the inner circumferential wall and the outer circumferential wall includes a diameter-expanded portion of which an inner diameter increases toward downstream in the air flow direction.

Since at least one of the inner circumferential wall and the outer circumferential wall has the diameter-expanded portion in such a cooling device, the flow of air blown by the cooling fan is sufficiently increased.

A construction machine or a work machine according to another aspect of the invention includes any one of the above-described cooling devices.

Since the construction machine or the work machine includes the cooling device capable of enhancing the cooling efficiency, the construction machine or the work machine can ensure a highly quiet operation by reducing operational noise generated by the cooling fan.

In the cooling device according to the aspect of the invention, the flow of air blown by the cooling fan can be sufficiently increased without increasing the rotation speed of the cooling fan.

BRIEF DESCRIPTION OF DRAWINGS

FIG. 11 is a graph showing a relationship between air-flow-direction lengths of an inner circumferential wall and an outer circumferential wall, a width between the inner circumferential wall and the outer circumferential wall, wind flow and noise.

BEST MODE FOR CARRYING OUT THE INVENTION

As an exemplary embodiment of the invention, a hydraulic excavator (construction machine) 1 including a cooling unit 20 (a cooling device according to the aspect of the invention) will be described below with reference to the accompanying drawings.

First Exemplary Embodiment

Entire Arrangement of Hydraulic Excavator 1

Figure 1:
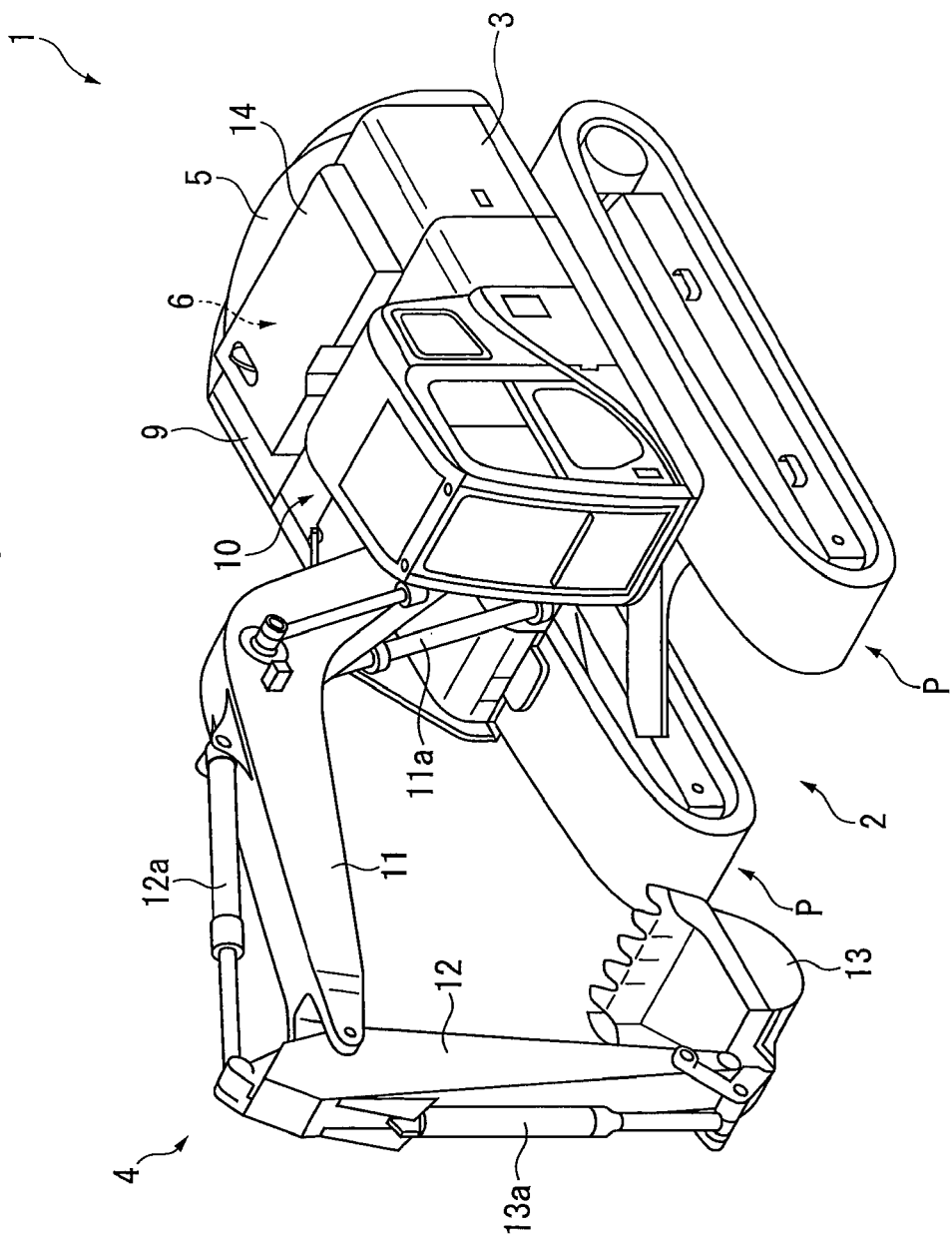
FIG. 1 is an overall view showing a hydraulic excavator including a shroud structure of a cooling fan according to an exemplary embodiment of the invention.
Figure 3:
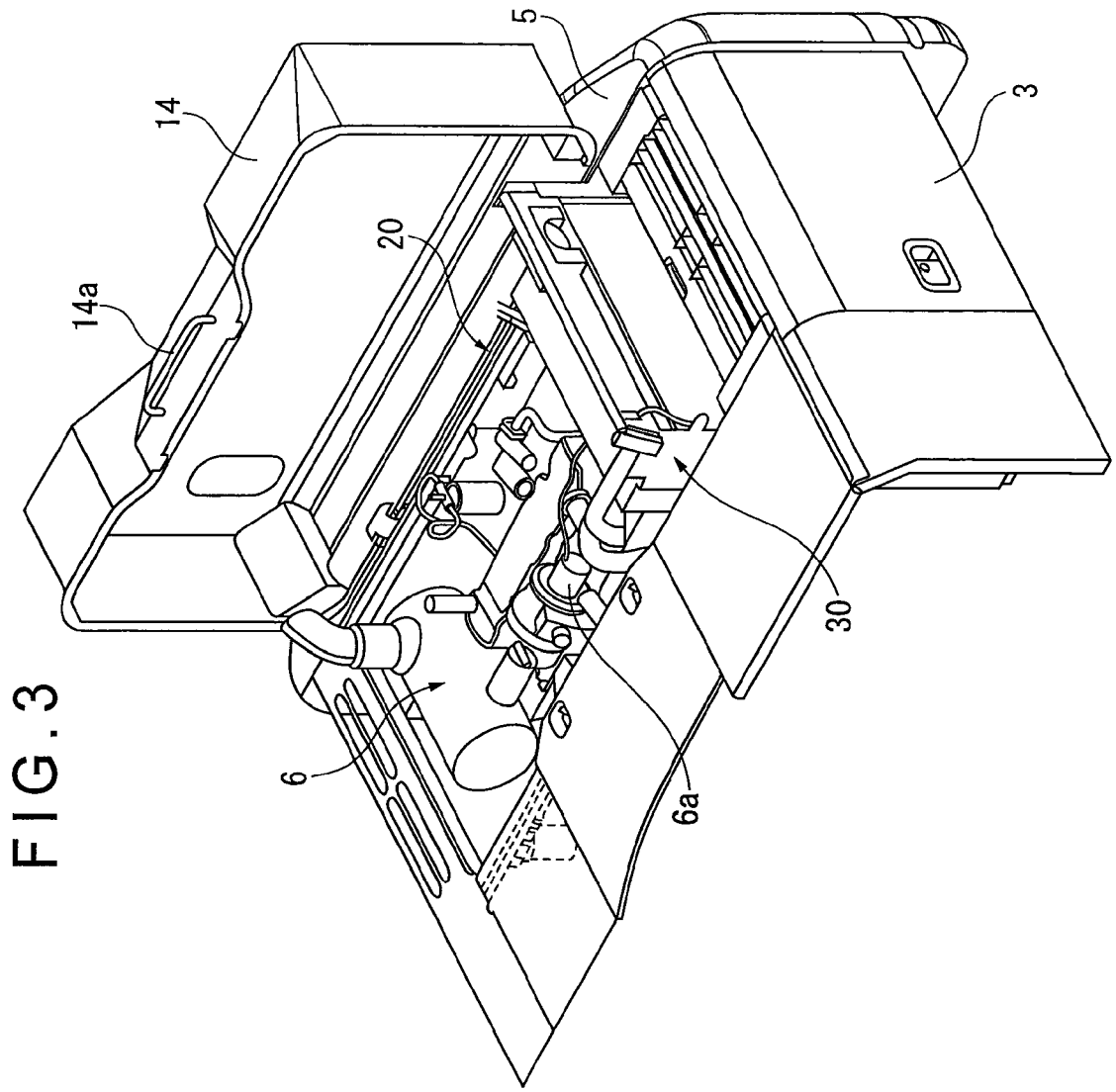
FIG. 3 is a perspective view showing an engine hood in an open state, the engine hood provided on an upper surface of the engine room shown in FIG. 2.

As shown in FIG. 1, a hydraulic excavator 1 according to a first exemplary embodiment includes: an undercarriage 2; a swing frame 3; a working equipment 4; a counterweight 5; an engine room 6; an equipment enclosure 9; a cab 10; and a cooling unit 20 (see FIG. 3).

The undercarriage 2 moves the hydraulic excavator 1 forward and backward by rotating crawler belts P wound around right and left ends in the traveling direction while carrying the swing frame 3 in a manner swingable on an upper surface of the undercarriage 2.

The swing frame 3 is swingable in any direction on the undercarriage 2. The working equipment 4, counterweight 5, engine room 6 and cab 10 are provided on an upper surface of the swing frame 3.

The working equipment 4 includes: a boom 11; an arm 12 provided on an end of the boom 11; and a bucket 13 provided on an end of the arm 12. The working equipment 4 is used to excavate gravel and sand at a site of civil engineering works by moving the boom 11, arm 12 and bucket 13 up and down using hydraulic cylinders 11a, 12a and 13a included in a hydraulic circuit (not shown).

The counterweight 5, which is made by solidifying scrap iron and concrete poured into a box formed by steel plates, is provided on a rear side of the engine room 6 on the swing frame 3 to balance the vehicle body during mining.

Figure 2:
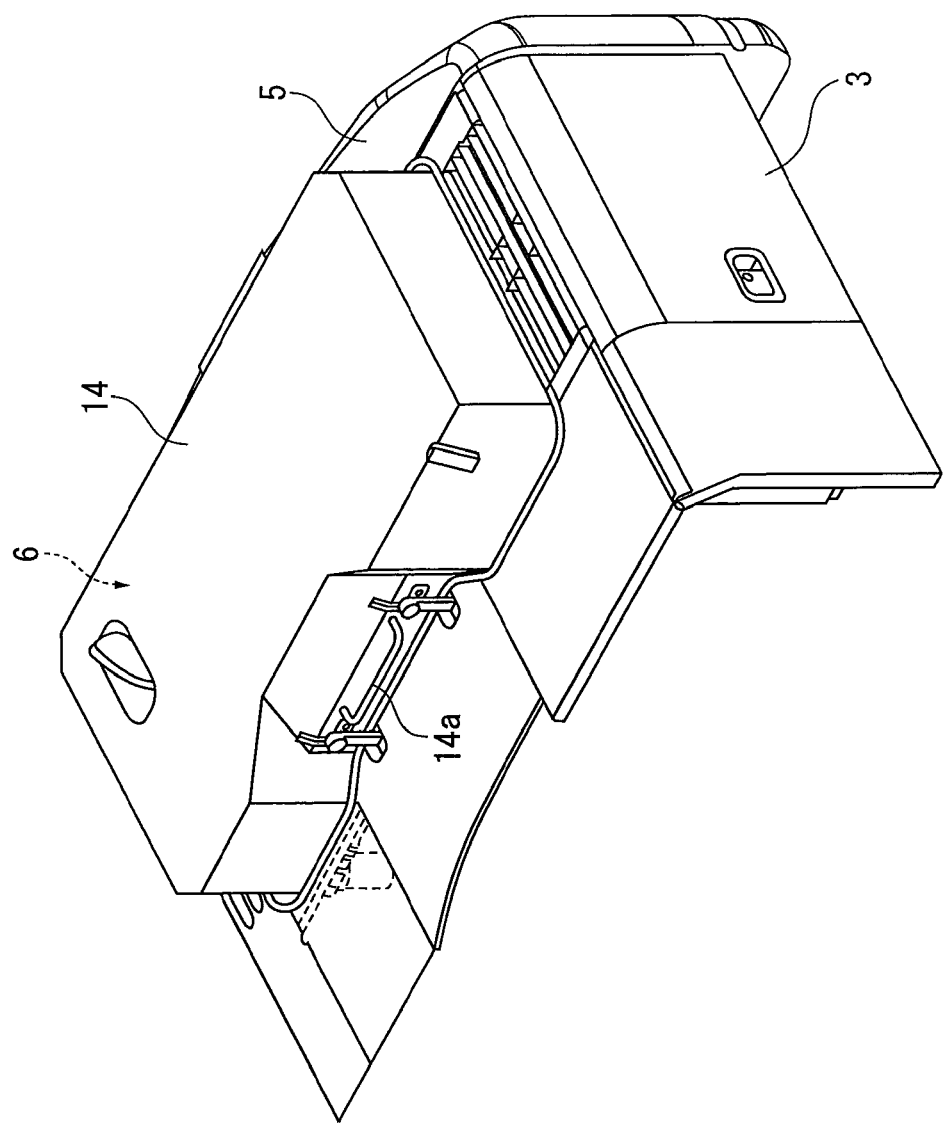
FIG. 2 is a perspective view showing an arrangement in the vicinity of an engine room and a counterweight mounted on a rear side of the hydraulic excavator.

As shown in FIGS. 2 and 3, the engine room 6 is adjacent to the counterweight 5. The engine room 6 has an upper opening for inspection covered by an engine hood 14 openable and closable by a grab 14a. The engine room 6 accommodates a cooling unit 20 including: an engine 6a as a power source for driving the undercarriage 2 and the working equipment 4; and a cooling core 30 (see FIG. 3).

The equipment enclosure 9 is provided on a rear side of the working equipment 4 and includes a fuel tank, hydraulic oil tank and operation valve (not shown) therein.

The cab 10, which is a room for an operator of the hydraulic excavator 1, is provided on a front and left side on the swing frame 3 (a side of the working equipment 4) so that the operator can see a distal end of the working equipment 4.

Figure 4:
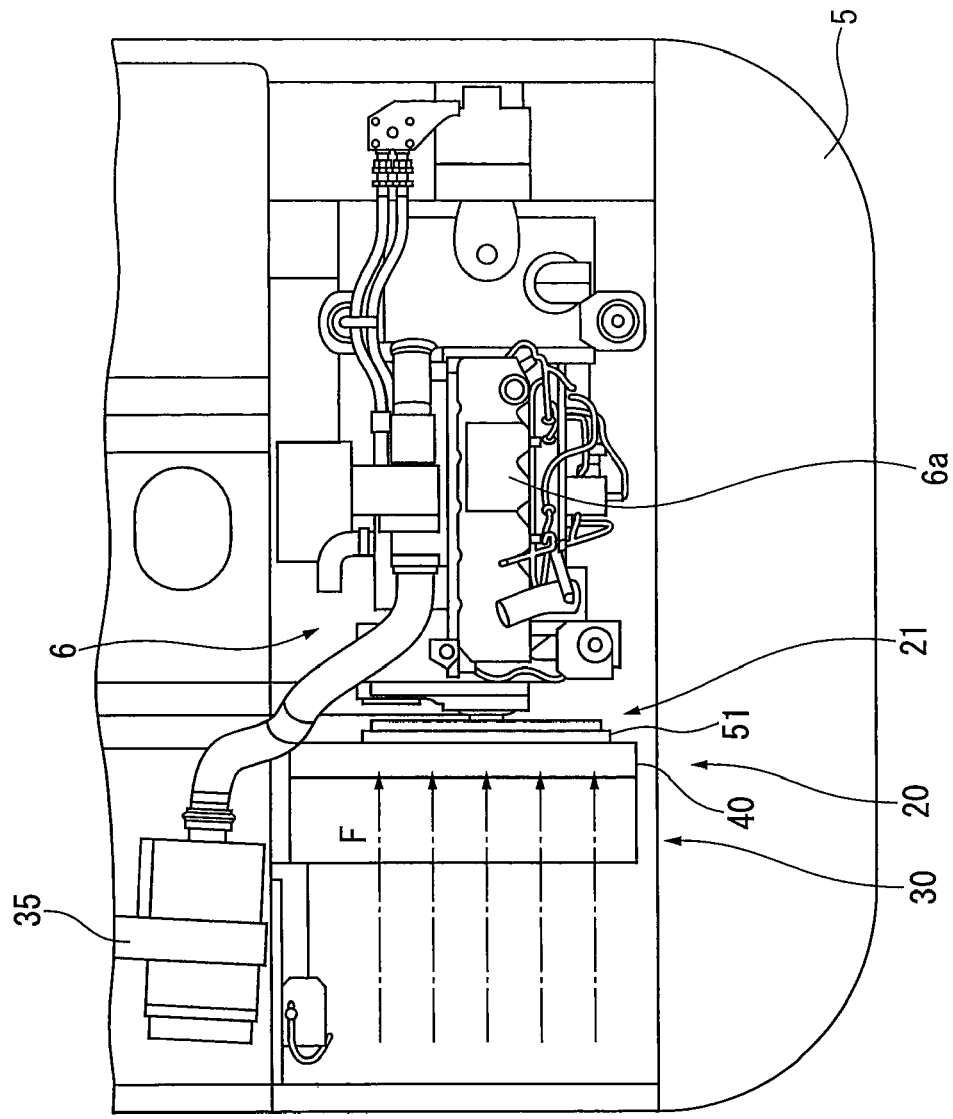
FIG. 4 is a plain view showing an arrangement within the engine hood shown in FIG. 3.

As shown in FIG. 4, the cooling unit 20 is adjacent to the engine 6a in the engine room 6 to cool cooling water and hydraulic oil flowing through the engine 6a. The arrangement of the cooling unit 20 will be described later in detail.

[Cooling Unit 20]

As shown in FIGS. 3 and 4, the cooling unit 20 includes a cooling fan 21 and the cooling core 30. The cooling unit 20 also includes the later-described shroud 40 (see FIG. 6) to send a large volume of air to the cooling core 30 for efficient cooling while reducing the noise.

Figure 6:
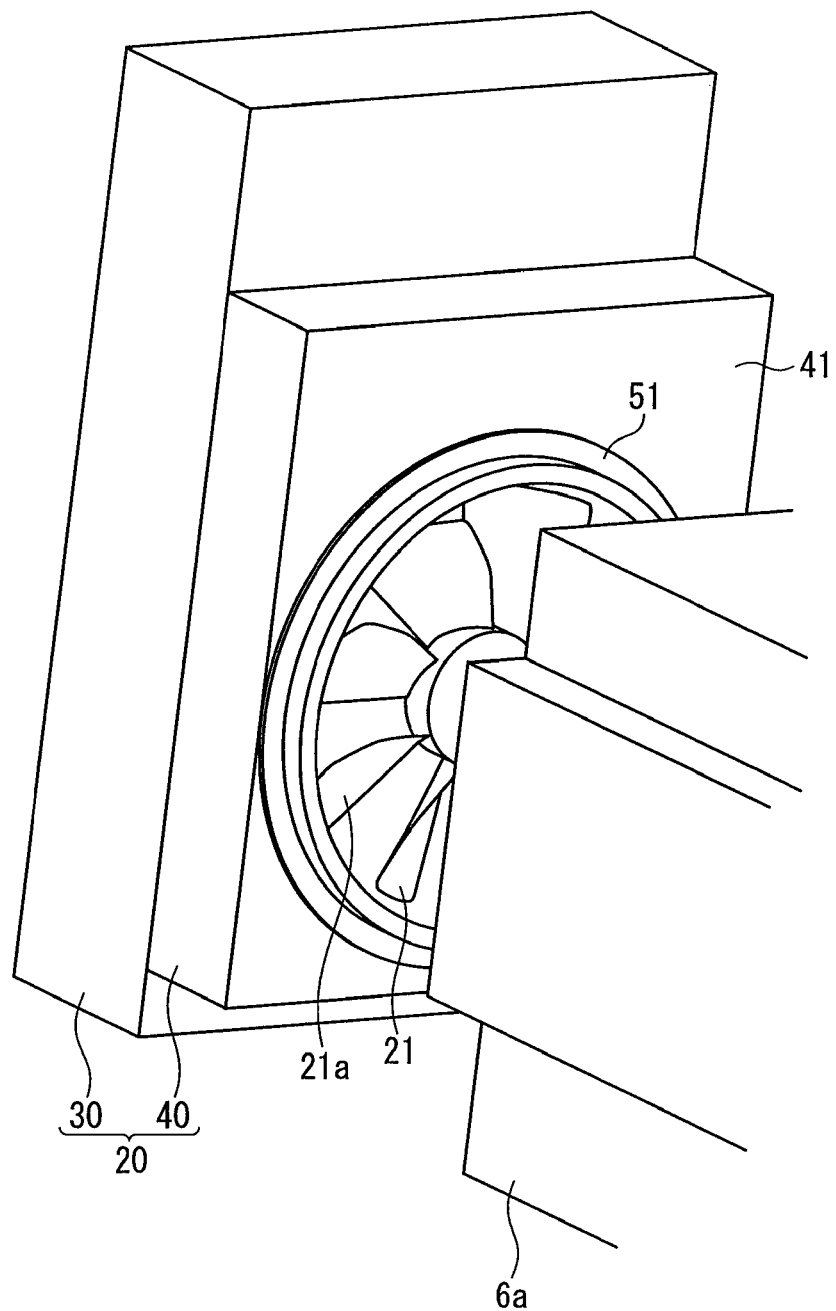
FIG. 6 is a perspective view showing an arrangement of a cooling unit.

As shown in FIG. 6, the cooling fan 21 is directly connected to the engine 6a. Vanes 21a (see FIG. 6) are rotated directly by the engine 6a. In this exemplary embodiment, when the cooling fan 21 is driven, air flows in a direction where the cooling fan 21 suctions the air as arrows F in FIGS. 4, 7 and 8 indicate. In other words, the cooling fan 21 is located on the downstream side of the cooling core 30 in the air flow generated by the cooling fan 21. The arrangement of the cooling fan 21 will be described later in detail. Hereinafter, the direction indicated by the arrows F in FIGS. 4, 7 and 8 will be referred to as an air flow direction. The left side and right side in FIGS. 4, 7 and 8 will be referred to respectively as an upstream side and a downstream side.

Figure 5:
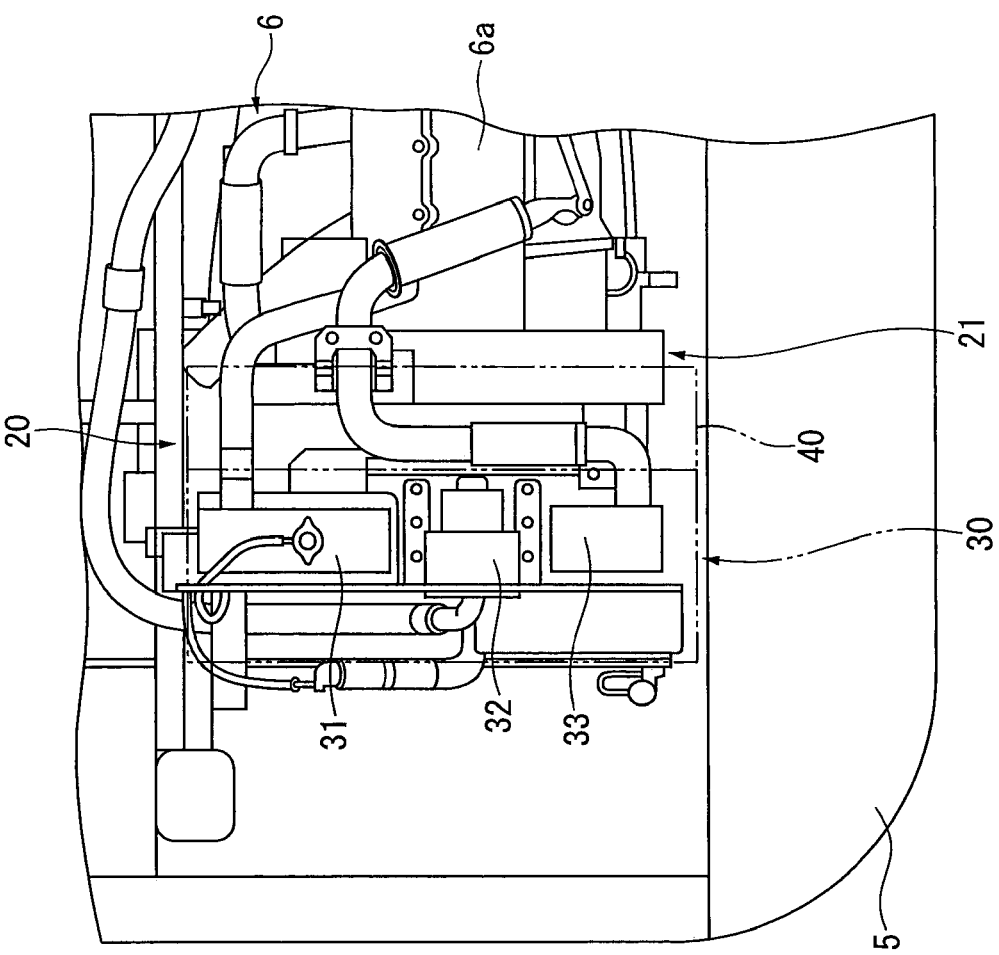
FIG. 5 is a partially enlarged view of FIG. 4.

The cooling core 30 is a unit for cooling the cooling medium by heat exchange with air. As shown in FIG. 5, the cooling core 30 includes a radiator 31, an oil cooler 32 and an aftercooler 33.

The radiator 31 reduces the temperature of cooling water flowing through the engine 6a by heat exchange between the cooling water and air generated by the cooling fan 21.

The oil cooler 32 reduces the temperature of oil to be delivered to the hydraulic cylinders 11a, 12a and 13a by heat exchange between oil supplied from the hydraulic oil tank to the hydraulic circuit and heated and air generated by the cooling fan 21.

The aftercooler 33 cools the heated air by heat exchange between air suctioned from an air cleaner 35 and discharged from a turbocharger (not shown) of the engine 6a and air generated by the cooling fan 21, and then delivers the cooled air to an intake manifold (not shown) of the engine 6a.

[Cooling Fan 21]

The cooling fan 21 is an axial-flow fan having a plurality of vanes 21a rotatable around a rotation shaft and driven by the engine 6a. The number of the vanes 21a depends on an airflow volume and a size of the cooling fan 21. Typically, the number of the vanes 21a is approximately 6 to 11.

The vanes 21a are rotated by the engine 6a. By rotating the plurality of vanes 21a, the generated air flow flows radially outward from the rotation shaft.

Figure 7:
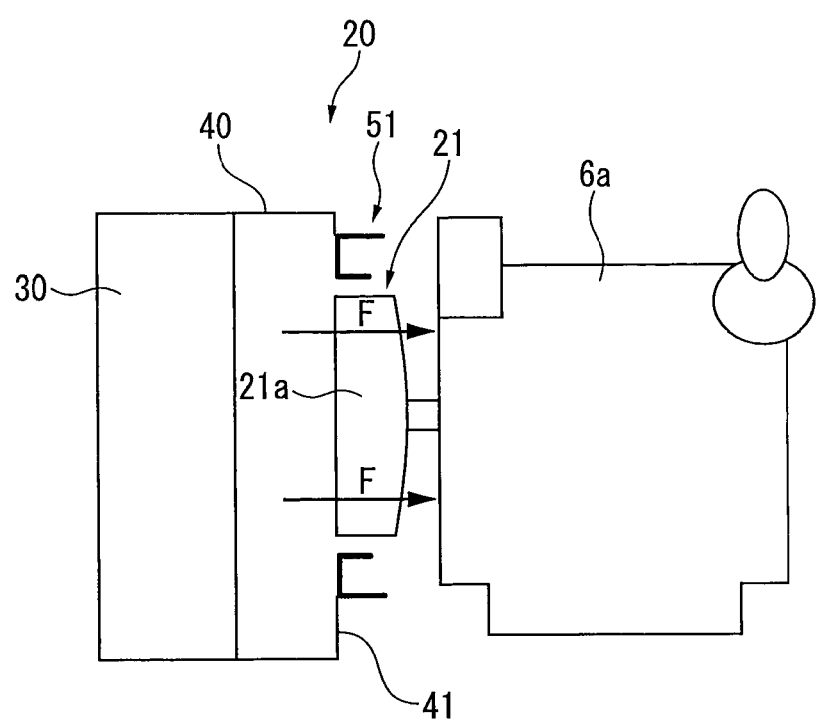
FIG. 7 schematically shows a relationship of an engine and the cooling unit.
Figure 8:
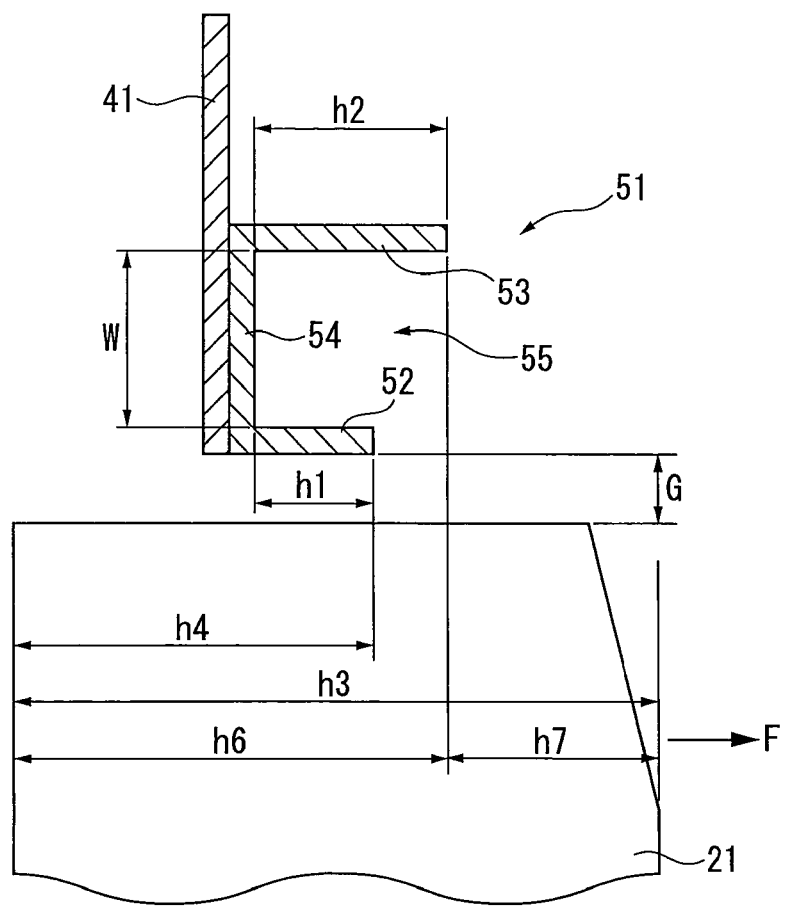
FIG. 8 is a cross-sectional view showing a positional relationship of a ring and an outer circumference of the cooling fan.

As shown in FIGS. 6 to 8, the shroud 40 covers an outer circumference of the vanes 21a of the cooling fan 21 and includes a case 41. The case 41 is a plate-shaped member having a circular opening conformed to the outer circumference of the vanes 21a.

A ring 51 is fixed to an inner circumference of the case 41. The ring 51, which is for increasing the flow of air blown by the cooling fan 21, is made of sheet-metal or resin.

As shown in FIG. 8, the ring 51 includes an inner circumferential wall 52, an outer circumferential wall 53 and a base 54. In this exemplary embodiment, a cylindrical body is employed like the inner circumferential wall 52 and outer circumferential wall 53. However, since it is only required that a space is substantially provided between the inner circumferential wall and the outer circumferential wall, the inner circumferential wall or the outer circumferential wall may be partially cut out as long as they are provided along the inner circumferential edge of the case 41 to surround the cooling fan 21.

The inner circumferential wall 52 is positioned on an edge of the opening of the case 41 and is adjacent to an outer circumferential edge of (the vanes 21a of) the cooling fan 21. The diameter of the inner circumferential wall 52 is larger than the outer diameter of the cooling fan 21. A clearance G between the inner circumferential wall 52 and the cooling fan 21 is, for example, 15 mm.

The outer circumferential wall 53 is positioned at a further radially outward position than the inner circumferential wall 52 to surround the inner circumferential wall 52. An annular space 55 is provided therebetween. The inner circumferential wall 52 and the outer circumferential wall 53 are concentrically-positioned cylindrical members and extend in parallel in the air flow direction.

In the first exemplary embodiment, no bore is formed on the inner circumferential wall 52 or the outer circumferential wall 53. An air-flow-direction length h1 of the inner circumferential wall 52 is smaller than an air-flow-direction length h2 of the outer circumferential wall 53. In other words, an air-flow-direction downstream side end of the outer circumferential wall 53 is positioned at a further downstream position in the air flow direction than an air-flow-direction downstream side end of the inner circumferential wall 52.

The base 54 is annular and flat to connect the outer circumferential wall 53 with the inner circumferential wall 52. As described above, the ring 51 is a single member and attachable to the case 41. The ring 51 may include fixed portions (not shown). For example, the fixed portions may be projections extending radially outward from the base at a plurality of positions in the circumferential direction. The ring 51 may be fixed to the case 41 by weld, adhesion or any other fixing member.

In the first exemplary embodiment, the air-flow-direction length h1 of the inner circumferential wall 52 is 20 mm, the air-flow-direction length h2 of the outer circumferential wall 53 is 30 mm, and a width W of the base 54 is 30 mm. However, the invention is not limited to these numerical values.

Next, a positional relationship of the cooling fan 21 and the ring 51 will be described below. As shown in FIG. 8, the outer circumferential edge of the cooling fan 21 is positioned at a further downstream position in the air flow direction than the inner circumferential wall 52 of the ring 51.

More specifically, the air-flow-direction downstream side end of the outer circumferential edge of the cooling fan 21 is positioned at a further downstream position in the air flow direction than the air-flow-direction downstream side end of the inner circumferential wall 52.

An air-flow-direction length of the cooling fan 21 will be referred to as h3. An air-flow-direction length of an upstream portion of the cooling fan 21, which is positioned at a further upstream position than the end of the inner circumferential wall 52, will be referred to as h4.

A percentage of h4/h3 will be referred to as an "interior covering ratio (%)." For example, the interior covering ratio is 62.5% in the first exemplary embodiment.

[Cooling Operation]

When the cooling fan 21 is driven by the engine 6a, air in the vicinity of the cooling core 30 is suctioned into the cooling fan 21. This flow of the air cools down the radiator 31 and the like of the cooling core 30.

Figure 9:
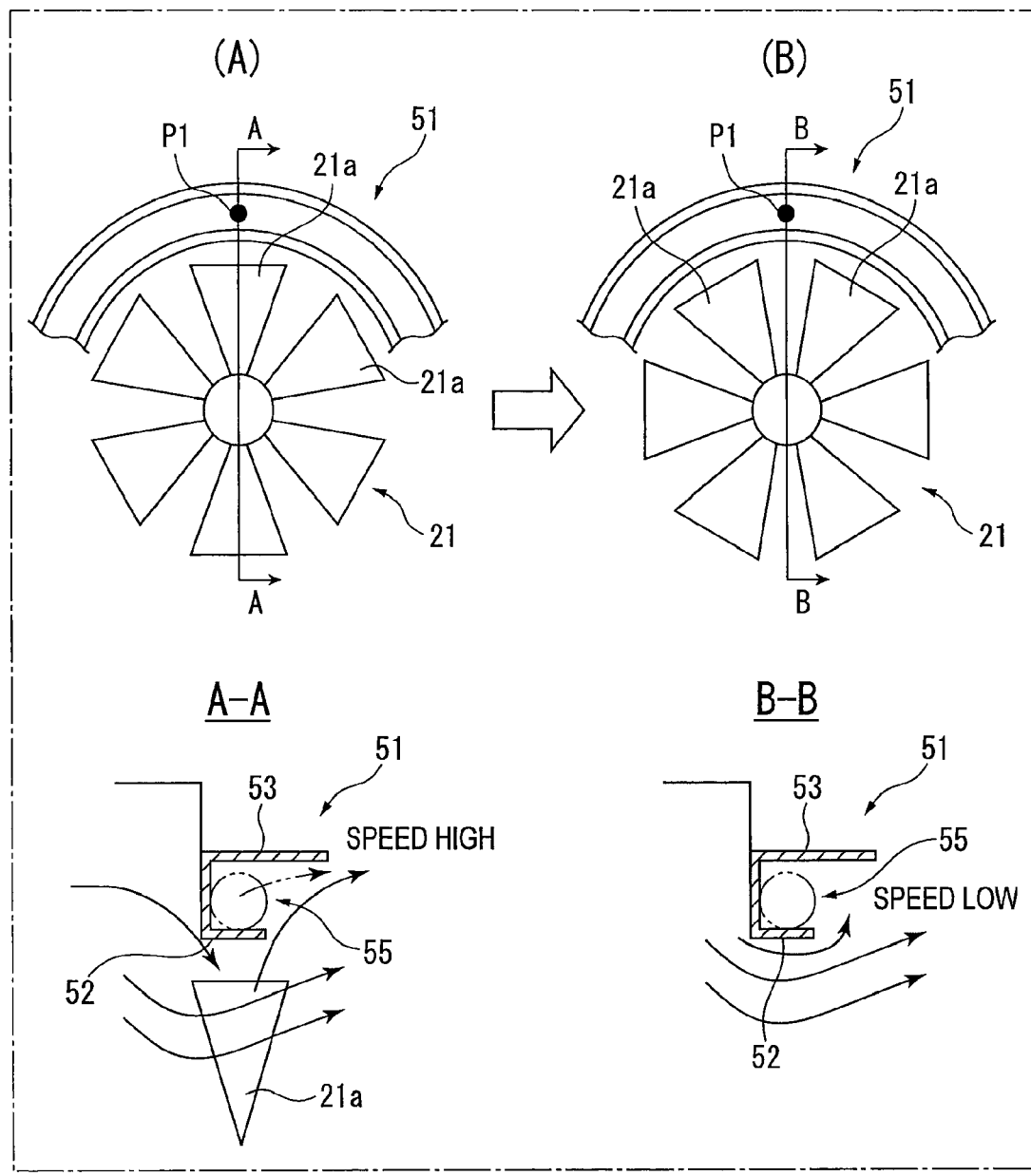
FIG. 9 is a schematic view for explaining effect of increase in wind flow by the ring.

As shown in FIG. 9 (A), when a vane 21a of the cooling fan 21 passes through a position P1 in the space 55 (an observation point in FIG. 9), air in the vicinity of the P1 is swept out by flow of air from the vane 21a, such that negative pressure is generated at the P1. Next, as shown in FIG. 9 (B), when the P1 in the space 55 (the observation point in FIG. 9) is positioned between vanes 21a of the cooling fan 21, the negative pressure generated at the P1 suctions the air. Due to such a phenomenon, flow of air blown by the cooling fan 21 is considerably increased as compared with a conventional arrangement.

Consequently, an amount of air supplied to the cooling core 30 is increased, so that cooling efficiency can be enhanced.

With such an arrangement according to the aspect of the invention, the negative pressure generated in the space 55 can suppress the generation and growth of Karman vortex, and thus the noise is considerably reduced as compared to a conventional arrangement. Thus, even when the rotation speed of the cooling fan 21 is increased to be more than the rotation speed of a conventional cooling fan, the noise is still in a tolerable range.

Especially, in this exemplary embodiment, since the air-flow-direction downstream side end of the cooling fan 21 is positioned at a further downstream position in the air flow direction than the air-flow-direction downstream side end of the inner circumferential wall 52 of the ring 51, the flow of air is further increased due to the above-described phenomenon.

This is presumably because air in the space 55 can be more effectively swept out when the vane 21 passes by in the above-described structure.

[Relationship between Dimensions of Inner Circumferential Wall 52 and Outer Circumferential Wall 53 and Relationship between Wind Flow and Noise]

Figure 10:
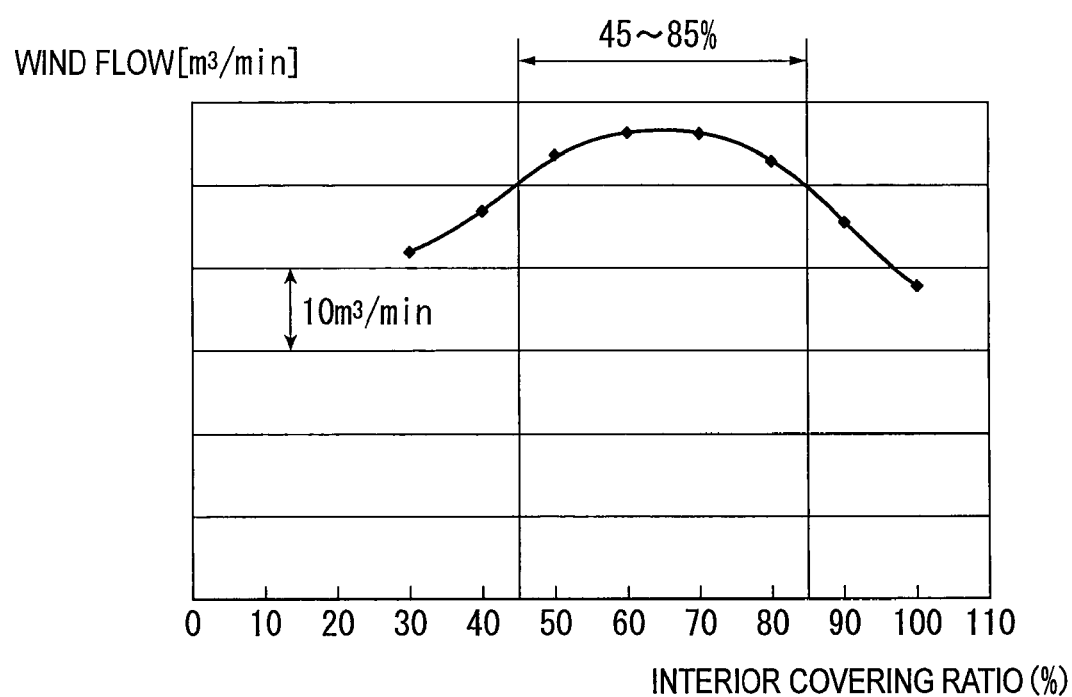
FIG. 10 is a graph showing a relationship between an interior covering ratio and a wind flow.

Initially, the interior covering ratio of the inner circumferential wall 52 was changed in the cooling fan 21 having the same rotation speed to measure the change of flow of air blown by the cooling fan 21. When the interior covering ratio was 100%, the wind flow was small as shown in FIG. 10. The wind flow was gradually increased as the interior covering ratio was reduced. The wind flow reached its peak when the interior covering ratio was appropriately 60 to 70%. The wind flow was reduced when the interior covering ratio was further reduced. When the interior covering ratio was less than 45% or more than 85%, the wind flow was almost equal to the wind flow exhibited when the interior covering ratio was 100%. In FIG. 10, a scale unit of the vertical axis of the graph is 10 $m^3$/min.

From the above, it was found that a sufficient wind flow was obtained when the interior covering ratio was in the range of 45 to 85%.

Next, while the interior covering ratio of the inner circumferential wall 52 having the air-flow-direction length h1 of 25 mm was maintained to be 70% in the cooling fan 21 having a diameter of 620 mm, an air-flow-direction length ratio h2/h1 between the air-flow-direction length h1 of the inner circumferential wall 51 and the air-flow-direction length h2 of the outer circumferential wall 53 was changed, and the change of wind flow and noise was measured. The air-flow-direction lengths h1 and h2 of the inner circumferential wall 52 and the outer circumferential wall 53, the air-flow-direction length ratio h2/h1 and a width W according to Examples 1 to 3 are shown in Table 1 as follows.

TABLE 1

|  | Example 1 | Example 2 | Example 3 |
|---|---|---|---|
| air-flow-direction length ratio h2/h1 | 1.20 | 1.40 | 1.60 |
| interior covering ratio h4/h3 | 70% | 70% | 70% |
| width W | 30 mm | 30 mm | 30 mm |
| air-flow-direction length h1 of inner circumferential wall | 25 mm | 25 mm | 25 mm |
| air-flow-direction length h2 of outer circumferential wall | 30 mm | 35 mm | 40 mm |
| h2 − h1 | 5 mm | 10 mm | 15 mm |

Likewise, while the interior covering ratio of the inner circumferential wall 52 having the air-flow-direction length h1 of 30 mm was maintained to be 75%, the air-flow-direction length h2 and the air-flow-direction length ratio h2/h1 were changed in Examples 4 to 6, the change of wind flow and noise was measured. The air-flow-direction lengths h1 and h2, the air-flow-direction length ratio h2/h1 and the width W according to Examples 4 to 6 are shown in Table 2 as follows.

TABLE 2

|  | Example 4 | Example 5 | Example 6 |
|---|---|---|---|
| air-flow-direction length ratio h2/h1 | 1.17 | 1.33 | 1.50 |
| interior covering ratio h4/h3 | 75% | 75% | 75% |
| width W | 30 mm | 30 mm | 30 mm |
| air-flow-direction length h1 of inner circumferential wall | 30 mm | 30 mm | 30 mm |
| air-flow-direction length h2 of outer circumferential wall | 35 mm | 40 mm | 45 mm |
| h2 − h1 | 5 mm | 10 mm | 15 mm |

Figure 12:
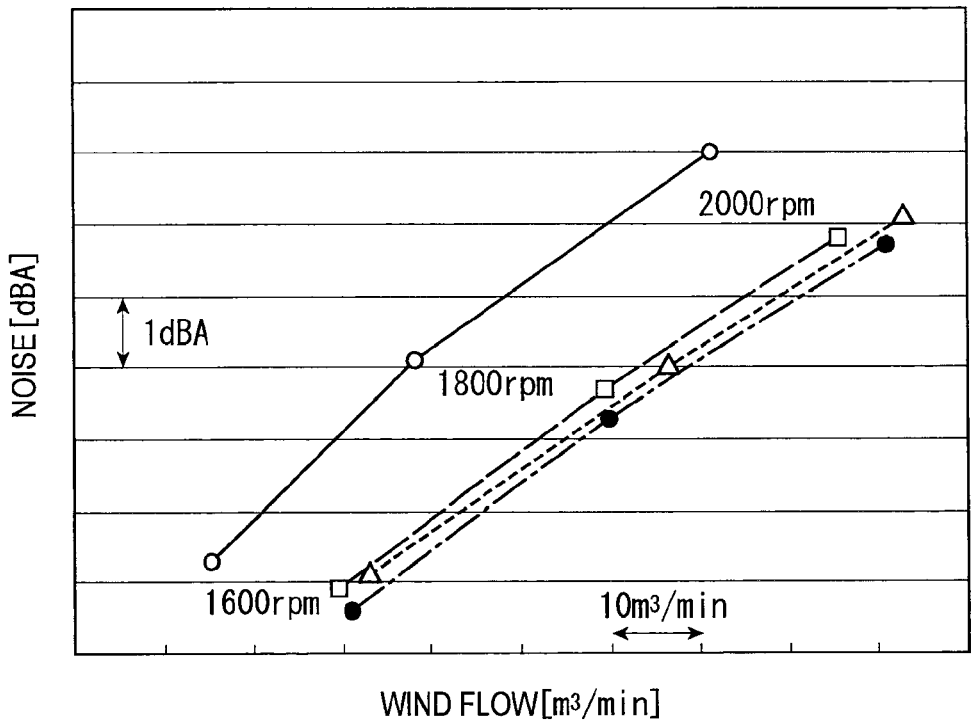
FIG. 12 is a graph showing a relationship between air-flow-direction lengths of an inner circumferential wall and an outer circumferential wall, a width between the inner circumferential wall and the outer circumferential wall, wind flow and noise.

As shown in FIGS. 11 and 12, it was found that the noise was considerably reduced with the same wind flow in Examples 1 to 6 as compared to an arrangement having no ring 51. It was also found that, when the width between the inner circumferential wall 52 and the outer circumferential wall 53 was 30 mm, the wind flow was increased and the noise was reduced at least by setting the air-flow-direction length ratio in the range of 1.17 to 1.60. In FIGS. 11 and 12, a scale unit of the vertical axis of the graph is 1 dBA and a scale unit of the horizontal axis is 10 m$^3$/min.

Further, the relationship between wind flow and noise of the cooling fan 21 having a diameter of 1280 mm were measured in view of the relationship between Example 7 where the width W was 15 mm and the air-flow-direction length ratio h2/h1 was 1.81, Example 8 where the width W was 55 mm and the air-flow-direction length ratio h2/h1 was 1.79, and Comparative 2 where no ring 51 was provided. The air-flow-direction lengths h1 and h2, the air-flow-direction length ratio h2/h1 and the width W according to Examples 7 and 8 and Comparative 2 are shown in Table 3 as follows.

TABLE 3

|  | Example 7 | Example 8 |
|---|---|---|
| air-flow-direction length ratio h2/h1 | 1.81 | 1.79 |
| interior covering ratio h4/h3 | 47% | 63% |
| width W | 15 mm | 55 mm |
| air-flow-direction length h1 of inner circumferential wall | 62 mm | 70 mm |
| air-flow-direction length h2 of outer circumferential wall | 112 mm | 125 mm |
| h2 − h1 | 50 mm | 55 mm |

Figure 13:
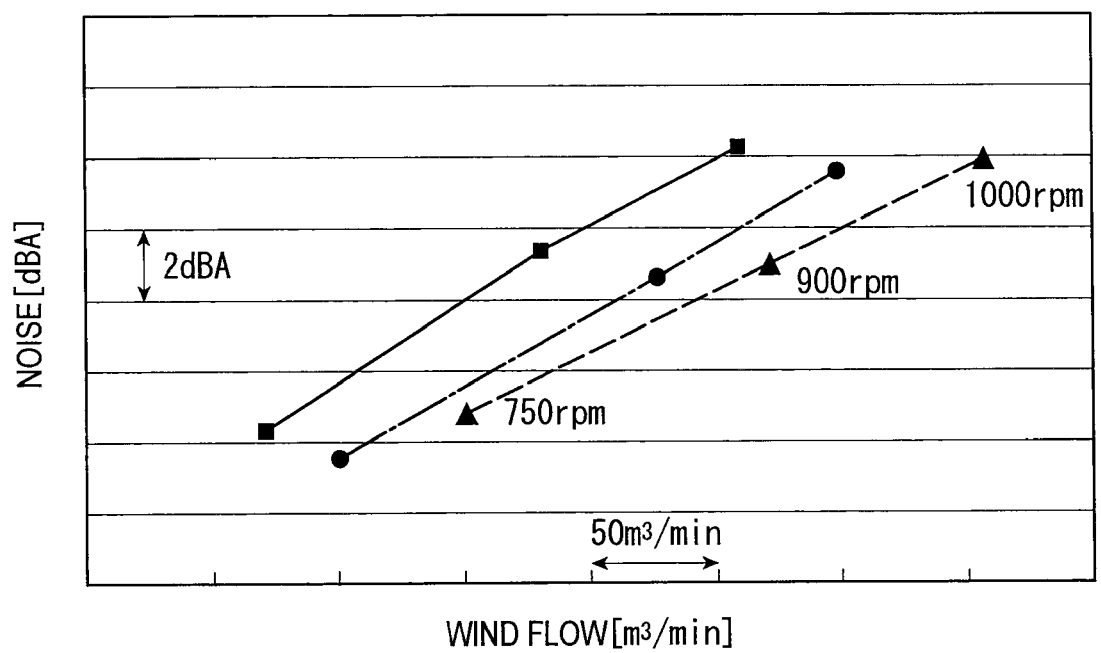
FIG. 13 is a graph showing a relationship between air-flow-direction lengths of an inner circumferential wall and an outer circumferential wall, a width between the inner circumferential wall and the outer circumferential wall, wind flow and noise.

As shown in FIG. 13, according to Example 7, it was found that, when the width W was 15 mm, the wind flow was increased and the noise was reduced even by setting the air-flow-direction length ratio h2/h1 to be approximately 1.8. Thus, presumably, the wind flow can be increased and the noise can be reduced even when the air-flow-direction length ratio h2/h1 is at least 1.8 or more. Incidentally, when the air-flow-direction length ratio h2/h1 is more than 1.8, the air-flow-direction length h2 of the outer circumferential wall 53 will be too increased, and thus a dead space will be easily generated in the engine room. Accordingly, the upper limit of the ratio is preferably approximately 1.8. In FIG. 13, a scale unit of the vertical axis of the graph is 2 dBA and a scale unit of the horizontal axis is 50 m$^3$/min.

While the measurements were performed using the hydraulic shovel 1 of a particular type in Examples 1 to 6, the same measurements were performed using another hydraulic shovel 1 of a different type to check whether the same advantages were obtainable. The air-flow-direction lengths h1 and h2, the air-flow-direction length ratio h2/h1 and the width W in the hydraulic shovel 1 of the different type according to Example 9 and Comparative 3 are shown in Table 4 as follows.

TABLE 4

|  | Example 9 |
|---|---|
| air-flow-direction length ratio h2/h1 | 1.30 |
| interior covering ratio h4/h3 | 61% |
| width W | 25 mm |
| air-flow-direction length h1 of inner circumferential wall | 50 mm |
| air-flow-direction length h2 of outer circumferential wall | 65 mm |
| h2 − h1 | 15 mm |

Figure 14:
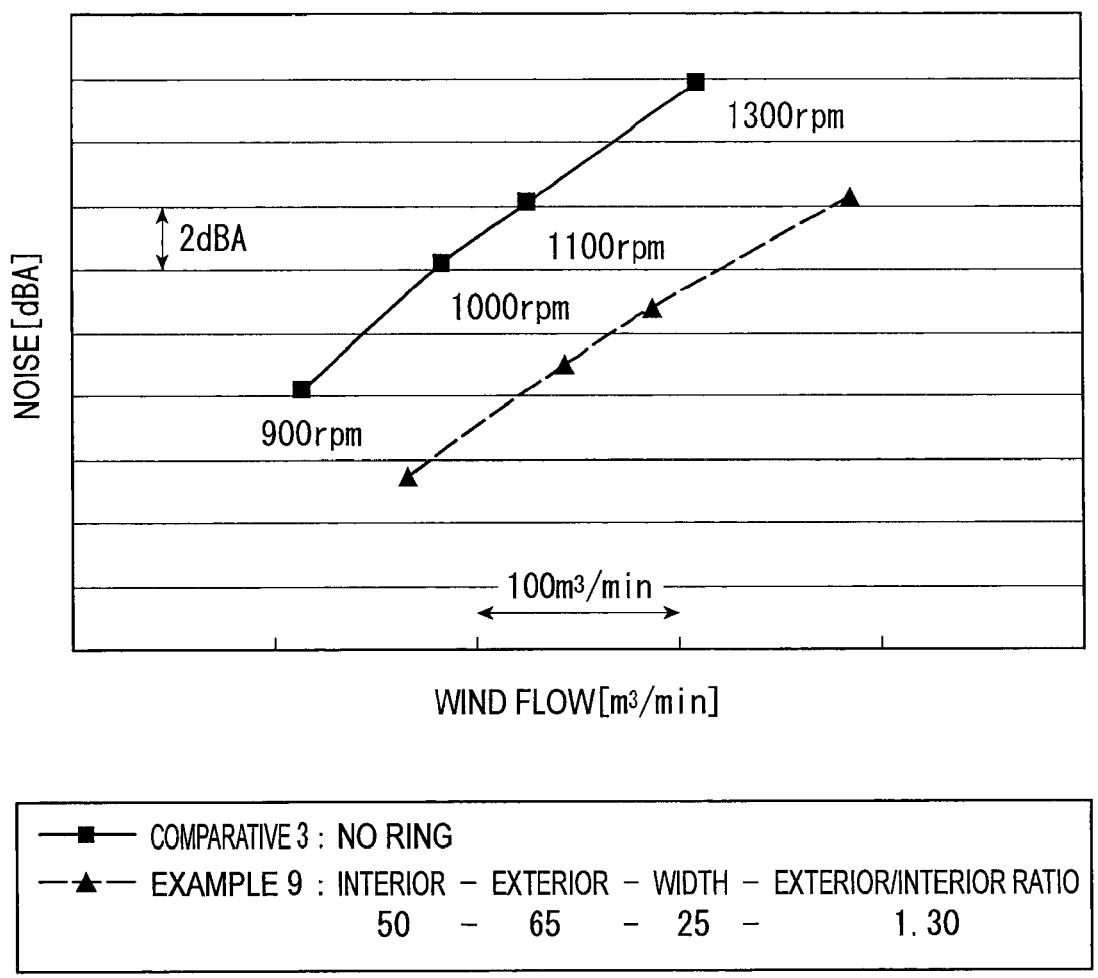
FIG. 14 is a graph showing a relationship between air-flow-direction lengths of an inner circumferential wall and an outer circumferential wall, a width between the inner circumferential wall and the outer circumferential wall, wind flow and noise.

As shown in FIG. 14, the wind flow was increased and the noise was reduced even when the hydraulic shovel 1 of the different type was used. Thus, it was found that the wind flow was consistently increased and the noise was consistently reduced, irrespective of a type of a construction machine, by setting the air-flow-direction length ratio h2/h1 and the width W in the ranges according to the aspect of the invention. In FIG. 14, a scale unit of the vertical axis of the graph is 2 dBA and a scale unit of the horizontal axis is 100 m$^3$/min.

Finally, checking was conducted to see how the wind flow was increased and the noise was reduced by the change of the width W when the air-flow-direction length ratio h2/h1 was approximately constant and the width W was considerably changed.

The width W was 55 mm and the air-flow-direction length ratio h2/h1 was 1.11 in Example 10, the width W was 25 mm and the air-flow-direction length ratio h2/h1 was 1.07 in Example 11, and the width W was 15 mm and the air-flow-direction length ratio was 1.07 in Example 12. The air-flow-direction lengths h1 and h2, the air-flow-direction length ratio h2/h1 and the width W according to Examples 10 to 12 are shown in Table 5 as follows.

TABLE 5

|  | Example 10 | Example 11 | Example 12 |
|---|---|---|---|
| air-flow-direction length ratio h2/h1 | 1.11 | 1.07 | 1.07 |
| interior covering ratio h4/h3 | 55% | 55% | 63% |
| width W | 55 mm | 25 mm | 15 mm |
| air-flow-direction length h1 of inner circumferential wall | 135 mm | 102.5 mm | 80.4 mm |
| air-flow-direction length h2 of outer circumferential wall | 150 mm | 110 mm | 86 mm |
| h2 − h1 | 15 mm | 7.5 mm | 5.6 mm |

Figure 15:
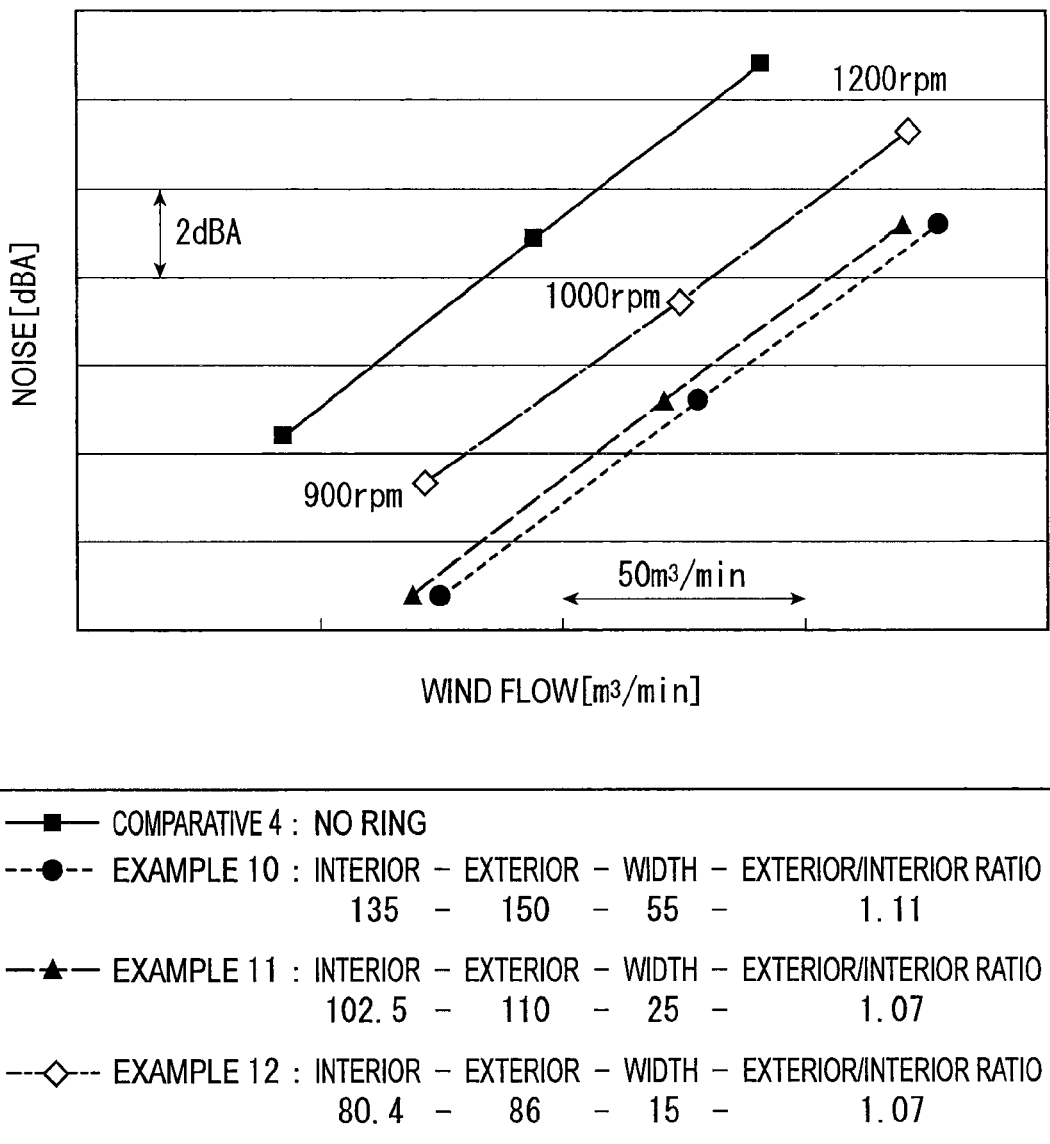
FIG. 15 is a graph showing a relationship between air-flow-direction lengths of an inner circumferential wall and an outer circumferential wall, a width between the inner circumferential wall and the outer circumferential wall, wind flow and noise.

Comparing Examples 10 to 12 with Comparative 4 where no ring 51 was provided, the wind flow was increased and the noise was reduced in Examples 10 to 12 as shown in FIG. 15. Presumably, the same advantages will be obtained even when only the outer circumferential wall 53 is enlarged. However, in terms of the capacity efficiency within the engine room, the width W is preferably 55 mm or less in order for a space between the inner circumferential wall 52 and the outer circumferential wall 53 not to become a dead space.

It was also found that the advantages were obtained until the length ratio h2/h1 was 1.07 in Examples 11 and 12. When the length ratio h2/h1 is less than 1.07, the air-flow-direction lengths of the inner circumferential wall 52 and the outer circumferential wall 53 will be substantially equal and thus air will not be easily delivered into the space between the inner circumferential wall 52 and the outer circumferential wall 53. Thus, presumably, the lower limit of the length ratio h2/h1 is preferably approximately 1.07. In FIG. 15, a scale unit of the vertical axis of the graph is 2 dBA and a scale unit of the horizontal axis is 50 m$^3$/min.

The followings findings have been found from the above:
the wind flow can be increased and the noise can be reduced by setting the air-flow-direction length ratio h2/h1 of the inner circumferential wall 52 and the outer circumferential wall 53 in the range of 1.07 to 1.81;

the same advantages can be obtained by setting the air-flow-direction length ratio h2/h1 is in the above-described range and setting the width W in the range of 15 to 55 mm; and the wind flow can be increased and the noise can be reduced irrespective of a type of a construction machine by arranging the ring 51 to have the air-flow-direction length ratio h2/h1 and the width W in the above-described ranges.

[Characteristics of Cooling Unit 20]

(1)

The cooling unit 20, which is a cooling device for use in the hydraulic excavator 1, includes: the cooling fan 21; the shroud 40 provided at the outer circumferential side of the cooling fan 21; and the space 55 having the inner circumferential wall 52 that is provided on the shroud 40 and adjacent to the outer circumference of the cooling fan 21. The space 55 increases the flow of air blown by the cooling fan 21, by generating the negative pressure with the air discharged from the cooling fan 21. The air-flow-direction downstream side end of the outer circumferential edge of the cooling fan 21 is positioned at a further downstream position in the air flow direction than the air-flow-direction downstream side end of the inner circumferential wall 52.

In the cooling fan 20, the negative pressure is generated in the space 55 when the cooling fan 21 is rotated to flow air, so that the flow of air blown by the cooling fan 21 is increased. More specifically, when one point within the space 55 is positioned between the vanes 21a, air is suctioned by the negative pressure generated therein, and subsequently the air is swept out by the vanes 21a. Since the air-flow-direction downstream side end of the outer circumferential edge of the cooling fan 21 is positioned at a further downstream position in the air flow direction than the air-flow-direction downstream side end of the inner circumferential wall 52, the sufficient amount of air is supplied to the space 55 and the flow of air blown by the cooling fan 21 is increased due to synergistic interaction between the air and the negative pressure within the space 55. Thus, the flow of air flowing in the vicinity of the cooling core 30 is increased, so that engine cooling performance of the radiator 31 and the like of the cooling core 30 is enhanced.

(2)

When the ratio (percentage) between the air-flow-direction length of the portion covered by the shroud 40 and the inner circumferential wall 52 on the outer circumferential edge of the cooling fan 21 and the whole air-flow-direction length of the cooling fan 21 is referred to as the interior covering ratio, the interior covering ratio is in the range of 45 to 85%. The flow of air blown by the cooling fan 21 is sufficiently increased by setting the interior covering ratio in an appropriate range. Thus, cooling capability is enhanced even when the rotation speed of the cooling fan 21 is the same as conventional. Even when the rotation speed of the cooling fan 21 is reduced, the same cooling capability can be obtained.

(3)

The space 55 is formed by the ring 51. The ring 51 includes the inner circumferential wall 52 adjacent to the outer circumference of the cooling fan 21 and the outer circumferential wall 53 extending toward the air-flow-direction downstream side further than the inner circumferential wall 52. The air-flow-direction downstream side end of the outer circumferential edge of the cooling fan 21 is positioned at a further downstream position in the air flow direction than the air-flow-direction downstream side end of the inner circumferential wall 52. When the cooling fan 21 is rotated to flow air, negative pressure is generated in the space 55 provided between the inner circumferential wall 52 and the outer circumferential wall 53 of the ring 51. Thus, the flow of air blown by the cooling fan 21 is increased as described above.

(4)

The ring 51 is made from a member different from the shroud 40. Since the ring 51 is attachable to the shroud 40, an appropriate ring 51 can be selected suitably for the arrangement of the shroud 40 and the cooling fan 21.

(5)

The ring 51 includes the annular base 54 for connecting the inner circumferential wall 52 with the outer circumferential wall 53. Since the ring 51 is an integral member formed by the inner circumferential wall 52, the outer circumferential wall 53 and the base 54, it is easy to manufacture and manage the ring 51.

(6)

The inner circumferential wall 52 and the outer circumferential wall 53 are cylindrical portions extending in parallel to the air flow direction. Thus, it is easy to manufacture the ring 51.

(7)

The cooling fan 21 is driven to rotate by the engine 6a included in a construction machine such as a hydraulic excavator. Since the cooling fan 21 is rotated by the rotation of the engine 6a, the arrangement can be simplified.

Second Exemplary Embodiment

In the first exemplary embodiment, the inner circumferential wall and the outer circumferential wall are provided as the annular ring 51 surrounding the cooling fan 21.

Figure 16:
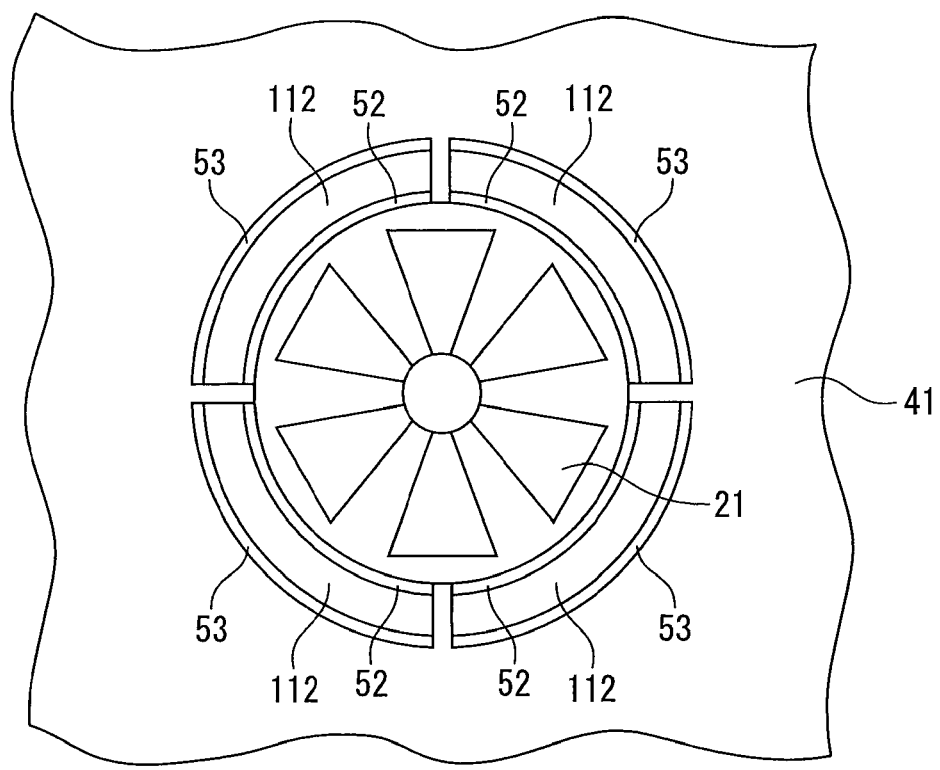
FIG. 16 is a front view showing an arrangement of an inner circumferential wall and an outer circumferential wall of a cooling fan according to a second exemplary embodiment of the invention.

In the cooling device according to the second exemplary embodiment, a plurality of wall components 112 are provided as shown in FIG. 16, in place of the consecutive ring 51. More specifically, the wall components 112 are combined around the rotation shaft of the cooling fan 21 to surround the cooling fan 21, which is different from the first exemplary embodiment.

As shown in FIG. 8 according to the first exemplary embodiment, the wall components 112 respectively include the inner circumferential wall 52 and the outer circumferential wall 53, and the air-flow-direction downstream side end of the cooling fan 21 is positioned at a further downstream position in the air flow direction than the air-flow-direction downstream side end of the inner circumferential wall 52.

The interior covering ratio is in the range of 45 to 85%, preferably 60 to 70% as in the first exemplary embodiment.

The wall components 112 are laid around the rotation shaft of the cooling fan 21 on an outer surface of the case 41 of the shroud and are fixed by a bolt, an adhesive or weld.

Incidentally, although a slight clearance is provided between adjacent wall components 112, cooling efficiency as described in the first exemplary embodiment is hardly impaired because substantially the whole outer circumference of the cooling fan 21 is surrounded by the inner circumferential wall 52 and the outer circumferential wall 53 of each of the wall components 112. To ensure the efficiency more reliably, the clearance between the adjacent wall components 112 may be filled in with a joint member, paste or weld after fixing the case 41 of the wall components 112.

While FIG. 16 shows four wall components, the number of the wall components is not limited thereto but may be approximately two to six.

According to the second exemplary embodiment, even when the cooling device includes a large cooling fan 21 used for a large construction machine, the inner circumferential wall 52 and the outer circumferential wall 53 can be formed to surround substantially the whole circumference of the cooling fan 21.

Other Exemplary Embodiments

Though the exemplary embodiments of the invention have been described above, the invention is not limited thereto, but includes modifications as long as such modifications are compatible with the invention.

(A)

Figure 17:
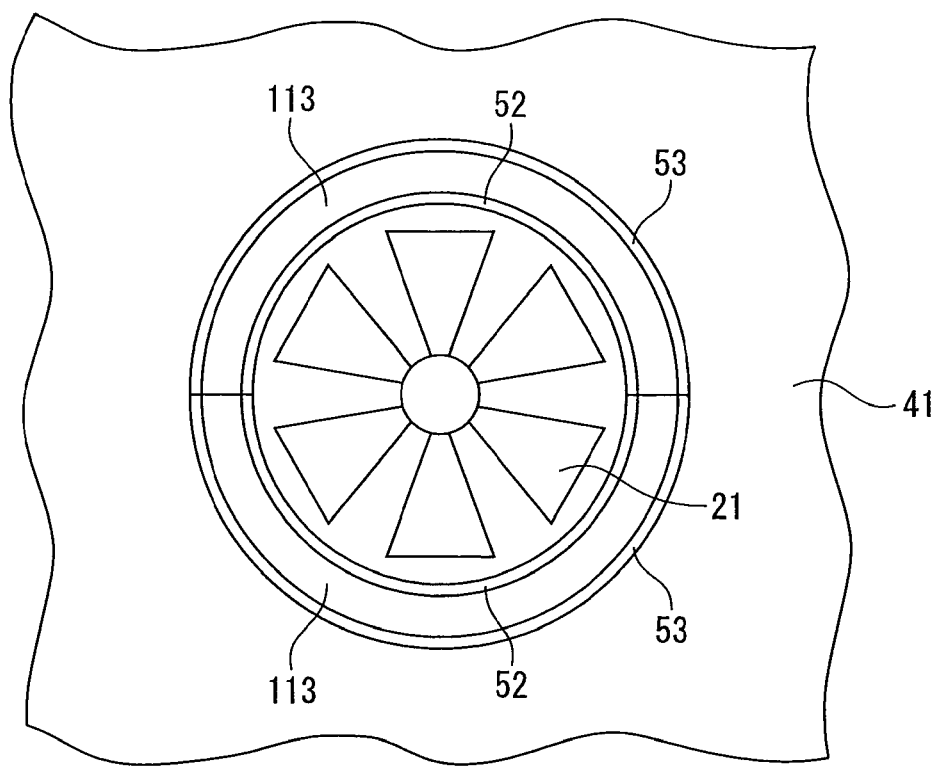
FIG. 17 is a front view showing an arrangement of a ring according to another exemplary embodiment.

Though the ring 51 is a single annular member in the first exemplary embodiment, the invention is not limited thereto. The ring may be formed by annularly arranging inner circumferential walls and outer circumferential walls consecutively by combining a plurality of members. For example, as shown in FIG. 17, a consecutive ring can be formed by combining ends of two semi-annular members 113 each having the inner circumferential wall 52 and the outer circumferential wall 53.

(B)

In the above-described exemplary embodiments, the inner circumferential wall and the outer circumferential wall extend in parallel in the air flow direction. However, the invention is not limited thereto.

Figure 18:
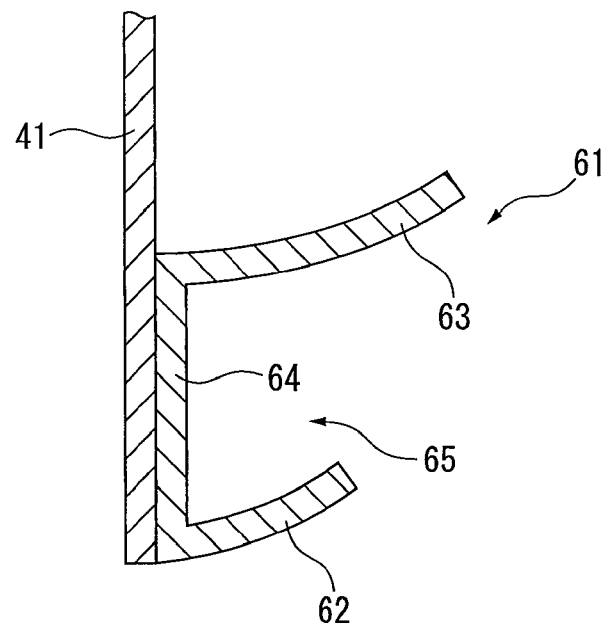
FIG. 18 is a cross-sectional view showing an arrangement of a ring according to another exemplary embodiment.

For example, a ring 61 shown in FIG. 18 includes an inner circumferential wall 62, an outer circumferential wall 63 and a base 64. The inner circumferential wall 62 is positioned on the edge of the opening of the case 41. The outer circumferential wall 63 is positioned at a further radially outward position than the inner circumferential wall 62, and an annular space 65 is provided therebetween. The inner circumferential wall 62 and the outer circumferential wall 63 are concentric to define a trumpet shape (a bottom-widened shape) of which a diameter increases as extending to the downstream side in the air flow direction. Incidentally, only either one of the inner circumferential wall and the outer circumferential wall may have a trumpet shape.

In such an exemplary embodiment, the same advantages can be attained as in the above-described exemplary embodiments. Further, this exemplary embodiment can reduce the noise by suppressing turbulence.

(C)

Figure 19:
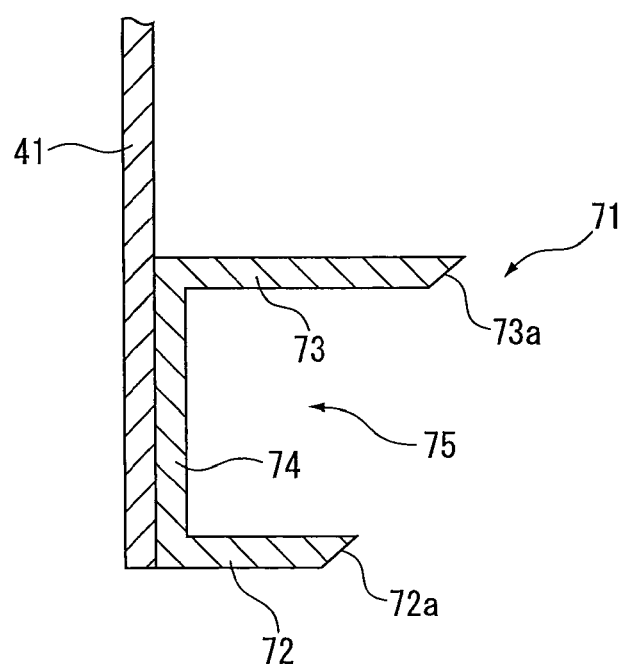
FIG. 19 is a cross-sectional view showing an arrangement of a ring according to another exemplary embodiment.

For example, a ring 71 shown in FIG. 19 includes an inner circumferential wall 72, an outer circumferential wall 73 and a base 74. The inner circumferential wall 72 is positioned on the edge of the opening of the case 41. The outer circumferential wall 73 is positioned at a further radially outward position than the inner circumferential wall 72, and an annular space 75 is provided therebetween. The inner circumferential wall 72 and the outer circumferential wall 73 are concentric to extend in parallel in the air flow direction. Specifically, a taper portion 72a is provided on a distal end of the inner circumferential wall 72. A taper portion 73a is provided on a distal end of the outer circumferential wall 73. The diameters of the taper portions 72a and 73a gradually increase toward the downstream side in the air flow direction. Incidentally, only either one of the inner circumferential wall and the outer circumferential wall may have the taper portion.

In such an exemplary embodiment, the same advantages can be attained as in the above-described exemplary embodiments. Further, this exemplary embodiment can reduce the noise by suppressing turbulence.

(D)

In the above-described exemplary embodiments, the inner circumferential wall and the outer circumferential wall are formed by an integrated member.

However, the invention is not limited thereto.

Figure 20:
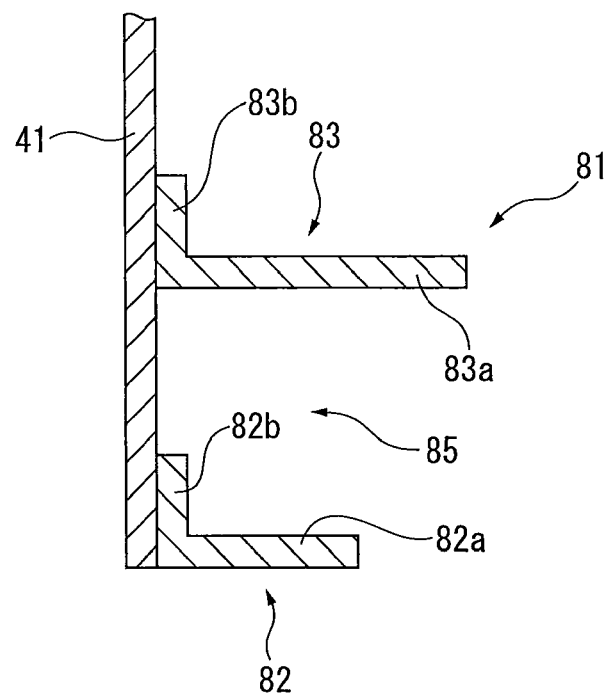
FIG. 20 is a cross-sectional view showing an arrangement of a ring according to another exemplary embodiment.

For example, a ring 81 shown in FIG. 20 is formed by two separate members of an inner circumferential wall 82 and an outer circumferential wall 83. An annular space 85 is provided between the inner circumferential wall 82 and the outer circumferential wall 83. The inner circumferential wall 82 includes a cylindrical portion 82a and a fixed portion 82b. The fixed portion 82b is fixed to the case 41 by a bolt or weld. The outer circumferential wall 83 includes a cylindrical portion 83a and a fixed portion 83b. The fixed portion 83b is fixed to the case 41 of the shroud 40 by a bolt or weld.

In such an exemplary embodiment, the same advantages can be attained as in the above-described exemplary embodiments.

(E)

In the above-described exemplary embodiments, the inner circumferential wall and the outer circumferential wall are formed by members different from the shroud. However, the invention is not limited thereto.

Figure 21:
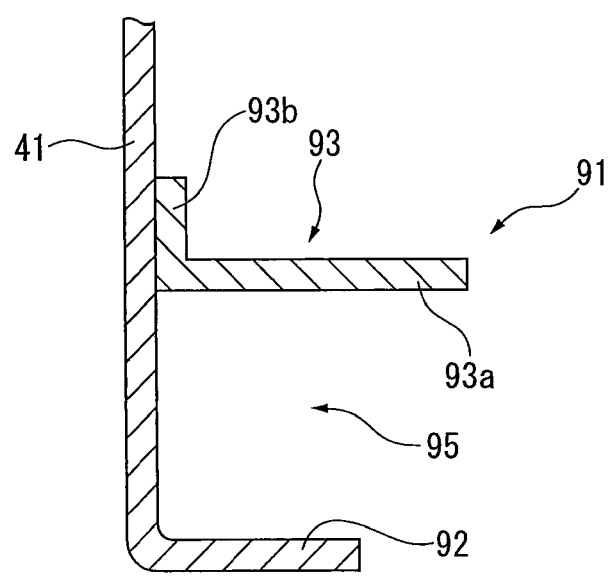
FIG. 21 is a cross-sectional view showing an arrangement of a ring according to another exemplary embodiment.

For example, a ring 91 shown in FIG. 21 is formed by an inner circumferential wall 92 formed by bending the inner circumferential edge of the case 41 and an outer circumferential wall 93. An annular space 95 is provided between the inner circumferential wall 92 and the outer circumferential wall 93. The outer circumferential wall 93 includes a cylindrical portion 93a and a fixed portion 93b. The fixed portion 93b is fixed to the case 41 of the shroud 40 by a bolt or weld.

In such an exemplary embodiment, the same advantages can be attained as in the above-described exemplary embodiments.

(F)

Figure 22:
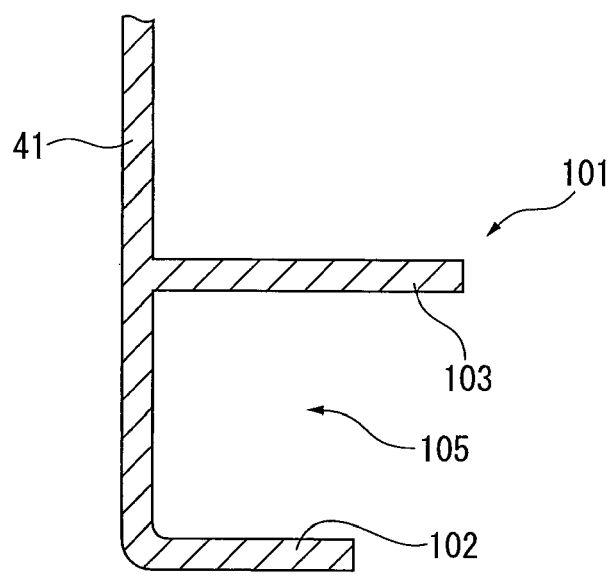
FIG. 22 is a cross-sectional view showing an arrangement of a ring according to another exemplary embodiment.

The ring may be integrated with the shroud according to an aspect of the invention. As shown in FIG. 22, a ring 101 is integrated with the case 41 of the shroud. An inner circumferential wall 102 is provided on the inner circumferential edge of the case 41 and an outer circumferential wall 103 is provided on the outer surface of the case 41. Further, a space 105 for generating negative pressure is provided between the inner circumferential wall 102 and the outer circumferential wall 103.

In such an exemplary embodiment, the case 41 of the shroud and the ring 101 may be made of resin by a method such as injection molding. Such a shroud is favorably adoptable for a small construction machine which only requires a certain level of durability.

In such an exemplary embodiment, the same advantages can be attained as in the above-described exemplary embodiments. Further, the load of assembling work can be reduced by reduction of the number of parts, and the weight of a construction machine can be reduced.

(G)

In the above-described exemplary embodiments, the cooling fan 21 is exemplarily rotated directly by the engine 6a as shown in FIG. 4. However, the invention is not limited thereto.

For example, the cooling fan may be rotated by a hydraulically-actuated motor provided in the vicinity of the cooling core such as the radiator.

Such an arrangement can be designed without concern for influence by vibration of the engine unlike an arrangement for the cooling fan rotated directly by the engine. Thus, the clearance G between the cooling fan 21 and the inner circumferential wall 52 of the ring 51 provided on the shroud 40 can be minimized. Consequently, air in the vicinity of the shroud 40 can flow more smoothly, thereby reducing the noise and enhancing cooling efficiency of the cooling core.

Alternatively, the cooling fan may be rotated by an electric motor.

(H)

In the above-described exemplary embodiments, the intake cooling unit 20 is exemplarily used, in which the cooling fan 21 is provided on the downstream side of the cooling core 30 in the air flow direction as shown in FIG. 4. However, the invention is not limited thereto.

Figure 23:
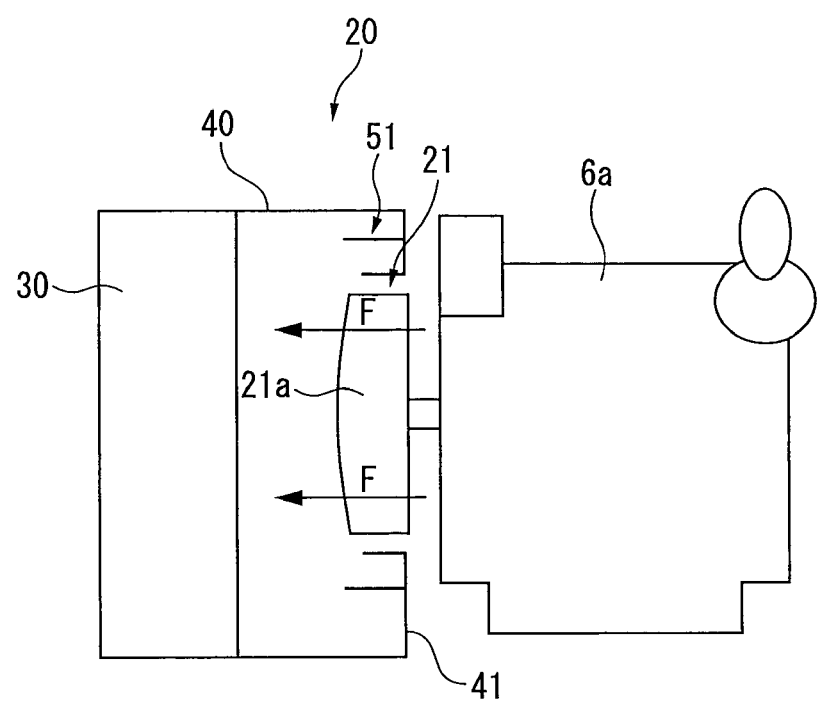
FIG. 23 schematically shows a relationship between an engine and a cooling unit when the invention is applied to a blowoff cooling unit.

For example, as shown in FIG. 23, the invention is applicable to a so-called blowoff cooling unit 20 for sending air from the engine 6a to the cooling core 30 such as the radiator by the cooling fan 21.

In other words, even in the blowoff cooling unit 20, wind flow is increased as in the first exemplary embodiment by providing the ring 51 within the shroud 40, so that the cooling core 30 can be efficiently cooled and the noise can be reduced.

(I)

In the above-described exemplary embodiments, the cooling fan 21 is exemplarily described as an axial-flow fan as shown in FIG. 6. However, the invention is not limited thereto.

For example, the cooling unit may include other blast fan such as a sirocco fan and an obliquely axial-flow fan.

(J)

In the above-described exemplary embodiments, the radiator 31, the oil cooler 32 and the aftercooler 33 are exemplarily used as a heat exchanger of the cooling core 30. However, the invention is not limited thereto.

For example, only radiator may be used as a cooling core positioned opposite to the cooling fan according to the aspect of the invention. Alternatively, other heat exchangers may be used alone or in combination.

(K)

In the above-described exemplary embodiments, the hydraulic excavator 1 is exemplarily described as a construction machine including the shroud 40 of the cooling fan 21 according to the aspect of the invention as shown in FIG. 1. However, the invention is not limited thereto.

For example, the invention is also applicable to other construction machine such as a wheel loader or work machine such as a forklift in addition to the hydraulic excavator.

(L)

The above-described exemplary embodiments may be adopted alone or in combination.

The invention claimed is:

1. A cooling device, comprising:
   a cooling fan;
   a shroud provided at an outer circumferential side of the cooling fan;
   an inner circumferential wall that is fixed on the shroud and is provided at the outer circumferential side of the cooling fan to surround the cooling fan and to be spaced apart from the outer circumference of the cooling fan in a radial direction of the cooling fan by a predetermined distance, the inner circumferential wall being outside of and facing the cooling fan in the radial direction of the cooling fan; and
   an outer circumferential wall that is provided to surround the inner circumferential wall, the outer circumferential wall being outside of and facing the inner circumferential wall in the radial direction of the cooling fan, and the outer circumferential wall comprising an air-flow-direction downstream side end positioned at a further downstream position in an air flow direction than an air-flow-direction downstream side end of the inner circumferential wall, at least a portion of the outer circumferential wall including a cylindrical surface,
   wherein the cooling fan is rotatably provided in a space radially inside the inner circumferential wall,
   wherein an air-flow-direction downstream side end of an outer circumferential edge of the cooling fan is positioned at a further downstream position in the air flow direction than the air-flow-direction downstream side end of the inner circumferential wall,
   wherein the air-flow direction downstream side end of the outer circumferential wall is positioned at a further upstream position in the air flow direction than the air-flow direction downstream side end of the cooling fan,
   wherein a ratio between an air-flow-direction length of the outer circumferential wall and an air-flow-direction length of the inner circumferential wall is 1.07 or more and 1.81 or less, and
   wherein a width between the outer circumferential wall and the inner circumferential wall is 15 mm or more and 55 mm or less.

2. The cooling device according to claim 1, wherein an interior covering ratio is in a range of 45 to 85%, the interior covering ratio being defined as a ratio between: (i) an air-flow-direction length of a portion of the outer circumferential edge of the cooling fan covered by the shroud and the inner circumferential wall, and (ii) a maximum air-flow-direction length of the cooling fan.

3. The cooling device according to claim 1, wherein the inner circumferential wall and the outer circumferential wall are formed by members different from the shroud.

4. The cooling device according to claim 1, wherein at least one of the inner circumferential wall and the outer circumferential wall includes a cylindrical portion extending in parallel to the air flow direction.

5. The cooling device according to claim 1, wherein at least one of the inner circumferential wall and the outer circumferential wall includes a diameter-expanded portion of which an inner diameter increases toward downstream in the air flow direction.

6. A construction machine or a work machine, comprising the cooling device according to claim 1.

7. The cooling device according to claim 1, wherein at least one of the inner circumferential wall and the outer circumferential wall is a ring that is consecutively provided around a rotation shaft of the cooling fan.

8. The cooling device according to claim 1, wherein at least one of the inner circumferential wall and the outer circumferential wall is integrated with the shroud.

9. The cooling device according to claim 3, further comprising:
   an annular base connecting the inner circumferential wall to the outer circumferential wall.

10. The cooling device according to claim 1, wherein the cylindrical surface is radially spaced apart from the cooling fan and curved to correspond to the radial curvature of the outer circumferential edge of the cooling fan.

11. The cooling device according to claim 1, wherein at least a portion of the cylindrical surface tracks the radial curvature of the outer circumferential edge of the cooling fan.

12. The cooling device according to claim 11, wherein the entire cylindrical surface tracks the radial curvature of the outer circumferential edge of the cooling fan.

13. The cooling device according to claim 1, wherein the inner circumferential wall and the outer circumferential wall define an annular space therebetween that surrounds the cooling fan.

14. The cooling device according to claim 1, wherein the cylindrical surface of the outer circumferential wall surrounds an entire circumference of the inner circumferential wall.

15. The cooling device according to claim 1, wherein each of the inner circumferential wall and the outer circumferential wall is a ring that is consecutively provided around a rotation shaft of the cooling fan.

* * * * *